(12) United States Patent
Steingrimsson

(10) Patent No.: US 9,923,949 B2
(45) Date of Patent: Mar. 20, 2018

(54) ALL-ELECTRONIC ECOSYSTEMS FOR DESIGN AND COLLABORATION

(71) Applicant: Baldur Andrew Steingrimsson, Portland, OR (US)

(72) Inventor: Baldur Andrew Steingrimsson, Portland, OR (US)

(73) Assignee: Baldur A. Steingrimsson, Hillsboro, OR (US)

( * ) Notice: Subject to any disclaimer, the term of this patent is extended or adjusted under 35 U.S.C. 154(b) by 426 days.

(21) Appl. No.: 14/567,516

(22) Filed: Dec. 11, 2014

(65) Prior Publication Data

US 2015/0271218 A1    Sep. 24, 2015

Related U.S. Application Data

(60) Provisional application No. 61/969,655, filed on Mar. 24, 2014.

(51) Int. Cl.
*H04L 29/08* (2006.01)
*G06Q 10/10* (2012.01)

(52) U.S. Cl.
CPC .......... *H04L 67/02* (2013.01); *G06Q 10/101* (2013.01)

(58) Field of Classification Search
None
See application file for complete search history.

(56) References Cited

U.S. PATENT DOCUMENTS

| | | | |
|---|---|---|---|
| 6,285,369 B1 | 9/2001 | Kross et al. | |
| 6,968,346 B2 | 11/2005 | Hekmatpour | |
| 7,096,454 B2 | 8/2006 | Damm | |
| 2006/0089912 A1* | 4/2006 | Spagna | G06F 21/10 705/51 |
| 2010/0008500 A1* | 1/2010 | Lisanke | G06F 21/10 380/201 |
| 2014/0095695 A1* | 4/2014 | Wang | G06F 9/5088 709/224 |
| 2014/0118223 A1* | 5/2014 | Jensen | G06F 3/048 345/2.2 |
| 2014/0250143 A1 | 9/2014 | Dai | |

* cited by examiner

*Primary Examiner* — Angela Nguyen

(57) ABSTRACT

This invention presents Ecosystems addressing limited capabilities for interactive team design, amidst thrust for improved productivity, enhanced creativity and higher quality. The Ecosystem for Team Design and Collaboration presents apparatus for taking snapshots of whiteboards with sketches from planning, design or brainstorming meetings, using image sensor embedded in a mobile client, for offering a vector representation of the content and hence expediting the preparation of 'presentable entities' (eliminating the need to redraw). The Ecosystem for Learning and Team Design outlines a flexible design methodology for automatically assessing the quality of design activities relative to a given design process. It is the only learning tool for computer aided design (CAD) capable of assessing all the five design stages. Its assessment engine, the e-design process, is modular and can be integrated into electronic lab notebooks. Its input, the standardized e-design notebooks, are also quite versatile and can accommodate complex 3D CAD files.

9 Claims, 13 Drawing Sheets

ALL-ELECTRONIC ECOSYSTEMS FOR DESIGN AND COLLABORATION

CROSS REFERENCE TO RELATED APPLICATIONS

Provisional application No. 61/969,655, filed on Mar. 24, 2014.

BACKGROUND OF THE INVENTION

1. Technical Field Description

One can argue that traditional engineering log books do not constitute an ideal medium for fostering creativity, or for enhancing productivity, in the present age of digital design. The digitally sophisticated millenials want to be able to utilize their mobile devices as a one-stop shop for design, collaboration, as a learning tool as well as for their communication needs (e.g., for e-mail or web browsing). They have grown accustomed to communication interfaces that enable them to communicate with their colleagues in real time, only through a few clicks. Mobile computing devices, such as tablet PCs, can offer other essential properties, in addition to the portability, such as the means for customization, enabling one (in theory) to customize the mobile devices to suit different learning styles.

In the corporate world productivity is the name of the game, and there design usually takes place in a team environment. For large, multi-national organizations, members of given project teams may be physically located in different buildings, on a given campus, or even on different continents. They may be working on more than one project, and may not be able to attend every single project meeting due to scheduling conflicts. Yet, there are high expectations in terms of the overall productivity of the organization. For this reason, team members want to be able to quickly capture material from design, planning or brainstorming meetings, such as from whiteboards, and exchange the material seamlessly and expeditiously. They want to be able to deliver presentable entities, such as formal project reports or presentations, without having to redraw or retype notes or design sketches from the whiteboard.

Furthermore, engineers working for a given design organization typically need to follow the internal design processes of the organization. Ideally, the design engineers would like to have access to a tool that could inform them of the extent to which their design work conformed to a given design process (the quality of their design activities relative to a certain stage in the design process). This would minimize the chance of design pitfalls, contribute to shorter design cycles and result in final designs of higher overall quality.

Within such organizations, it is of importance to supervisors that team members exchange design-related documents fast and seamlessly. This improves both the productivity of individual team members as well as of the team overall. Supervisors are looking for a tool that can facilitate seamless and expeditious reports and responses related to design activities. Or alternatively, they might be satisfied with a tool that improved organizational productivity by emphasizing direct communications and support among users, with minimal managerial overhead.

2. Description of Prior Art

Software for Team Collaboration and Management

Prior art on team collaboration software includes (Takatsuka 2006), (Rodriguez 2008), (Hetrick 2008) and (Packbier 2014). (Takatsuka 2006) outlines a user-friendly web-based team collaboration solution that provides diverseam members with the opportunity to participate in synchronous and asynchronous activities through a team space. Using a single platform that integrates team collaboration with business process management, team activities may be implemented through ad-hoc tasks and business process management driven steps to accomplish specific business objectives. (Rodriguez 2008) presents system and method for providing a ubiquitous anytime/everywhere environment that is realized through fixed and mobile technologies and scaffolded by group support software. The system includes a collaboration engine with architecture that supports both generic collaborative processes along with task specific team processes instantiated through a sophisticated suite of advanced modular technologies. (Hetrick 2008) presents method and apparatus for managing virtual team collaboration meetings. Team members enter answers to scrum questions into a virtual scrum tool, subject to user-defined answer length restrictions, at the beginning of their work day. The virtual scrum tool sends reminders to team members if scrum answers are not submitted within a user-defined time frame. (Packbier 2014) introduces a method, in a network, for synchronizing a plurality of software development teams, with each team working on an assigned subset of a code development project. A repository comprising the entire code base for the code development project is provided and the subset assigned to each team is correlated with every other team's assigned subset within the code development project.

Note that none of these inventions address team collaboration, in the context of design processes or team design, or in the context of recognition of graphics, text or equations from whiteboard images.

Prior Art on Team Design

Prior inventions related to team design include (Huben 1999), (Hiroaki 1999), (Sano 2002), (Belluomini 2002), (Hekmatpour 2005) and (Staples 2006).

(Huben 1999) presents a design control system suitable for use in connection with the design of integrated circuits and other elements of manufacture having many parts which need to be developed in a concurrent engineering environment with inputs provided by users, and/or systems which may be located anywhere in the world, providing a set of control information for coordinating movement of the design information through development and to release while providing dynamic tracking of the status of elements of the bills of materials in an integrated and coordinated activity control system utilizing a repository which can be implemented in the form of a database (relational, object oriented, etc.) or using a flat file system.

(Hiroaki 1999) and (Sano 2002) outline a CAD system for team-based design that provides an undo function and a redo function for execution by each designer during team-based design.

(Belluomini 2002) describes a method and system for designing electronic devices by encouraging reuse as a design principle and by rewarding both the design of reusable components as well as the subsequent reuse of such components. Typically, a design team evaluates each component in a proposed device for its potential to be implemented with a previously designed component. If a decision is made to forego previously designed components, the design team is encouraged to incorporate re-usability principles into the component design by a reward or compensation structure that rewards both the individual members of a team as well as the corporate entity to which the design team is assigned.

(Hekmatpour 2005) outlines a computer-based design framework for collaborative design of a product by distributed design team members. The design framework comprises: a virtual database management system, which receives data from a plurality of distinct sources and creates a single relational database interface to each of the distinct sources; software code associated with the virtual database management system for mapping various informational structures utilized by the distinct sources to a common XML syntax; and additional logic associated with the virtual database management system that provides publishing rules for extracting information on demand and publishing the extracted information in a format recognized by the requestor.

(Staples 2006) expands on a collaborative design process for a design team that generates an incomplete design for a project, outside suppliers that supply components for the project, and outside manufacturers that manufacture the complete design for the project.

Note that none of these inventions address team design in the context of formal design processes or assessment of quality of design activities relative to the stages in the design processes.

Automatic Assessment of Designs Relative to a Design Process

The design process is an iterative process used on ill-defined, and often open-ended, problems. This process is used by both professional and novice designers to enable them to solve design problems. It is a divergent-convergent thinking process that goes from the generation of diverse solutions to its depuration and to choosing the solution that yields the best match to the requirements. Generally, the five stages in the design process are requirements modeling, functional modeling, concept design, embodiments design, and detailed design (see FIG. 1). During the requirements modeling stage, analysis of market needs is performed to yield a problem statement that consists of the requirements that the product must fulfill. During the functional modeling stage, the functional relationships between structures and functions are established. In the concept design stage, several concepts are produced, each depicting the physical principles for solving the design problem. During the embodiment design stage, a more detailed analysis is performed on the concepts selected. In the detailed design stage, production and operating documents are developed for the manufacture of the design solution.

In terms of prior work on automatically evaluating designs relative to a design process, (Brewer 2000) offers the closest analogue. Here an attempt is made to automatically evaluate the cost and customer value of a design, and even generate the design from the requirements (!), but not assess compliance with the design process.

Automatic Recognition of Graphics, Text or Equations in Whiteboard Images

Prior art related to electronic whiteboards, and in particular those with recognition capabilities, includes (Damm 2006), (Zhang 2007), (Kritt 2011), (Chinese 2013a), (Farouki 2014) and (Steingrimsson 2014).

(Damm 2006) outlines a programmatic method for creating models using gestures. On an input device, such as an electronic whiteboard, a user draws a gesture which is recognized by a computer program and interpreted relative to a predetermined meta-model. The recognition capabilities appear to be limited to gesture recognition.

(Zhang 2007) describes a system that captures both whiteboard content and audio signals of a meeting using a digital camera and a microphone. The system can be retrofit to any existing whiteboard. It computes the time stamps of pen strokes on the whiteboard by analyzing the sequence of captured snapshots. There do not appear to be any recognition capabilities.

(Kritt 2011). presents method, apparatus, and computer program product for capturing markup layers on a whiteboard in relation to a projected image. A presentation page is displayed on a whiteboard as the projected image. A set of markups on the whiteboard associated with the presentation page is identified. The set of markups on the whiteboard is isolated from the projected image of the presentation page to create a user input layer. The user input layer is saved as an overlay for the presentation page. It appears the user input layer is saved as a raster image and no recognition applied to the content of the raster image.

(Chinese 2013a) presents an intelligent pointer with a rod body. An indicating end of the rod body is provided with a laser pen and a camera. A hand-held end of the rod body is provided with an electronic whiteboard control button, a face detection and identification button, and a laser pen indication button. Limited face recognition seems to be supported.

(Farouki 2014) provides generic description of technologies for providing whiteboard records accessibility mode to users interacting with a whiteboard, but without any type of recognition. A whiteboard may enable two or more users to interact with the whiteboard concurrently. The whiteboard may identify the users interacting with the whiteboard and may identify permission settings associated with the users. Based on the identification of the users and the permission settings detected, the whiteboard may activate a whiteboard records accessibility mode to provide access to whiteboard records.

(Steingrimsson 2014) outlines the principles of the SketchRec™ sketch recognition software that runs on desktop or laptop PCs and operates on a scanned-in raster representation of the sketch (where background artifacts are few to none). A dependency diagram for the master architecture is presented, one that has been artfully crafted not to contain any loops (for the purpose of efficient bug confinement). The interdependence of the graphical, text and equation objects is skillfully captured within the relations of an application program interface. This API also stores the vector representation of the graphical, text and equation objects in a scalable vector graphics format. Once in vector format, modifying the image sketch becomes quite easy. The objects can be copied, deleted or moved around at will. Derivative versions of the key design ideas can be quickly generated (with no need to redraw).

Agile Processes for Software Development

While the continuous improvement nature of the assessment engine from the Ecosystem for Learning and Team Design, i.e., the e-design process, resembles that of agile processes for software development, prior art on agile software development, such as (Holler 2014), tends to consist of quite specialized patents. These specialized patents do not appear to have clear overlap with the proposed invention.

Electronic Notebooks for Design

Among significant prior art on electronic lab notebooks, (Kross 2001) and (Bogan 2003) comprise the main inventions on electronic notebooks for computer aided design. These inventions describe method and apparatus for maintaining the information corresponding to a design. In one embodiment, an electronic notebook for maintaining design information maintains information corresponding to a design, and follows the steps of receiving a request to add note information corresponding to the design, and automatically copying, in response to the request, at least a portion of the design to a note of the electronic notebook. As a result, detailed design information such as, but not limited to, design intent and design history is maintained throughout the development and manufacturing of the design, as well as other information if desired, for the design.

Furthermore, (Koplow 2010) describes how electronic notebooks can be equipped with time-stamped evidentiary disclosure. Public encrypted disclosure provides a creation date verification system by making confidential information available in a secure encrypted form that can be decrypted at a later time to verify the existence of the content at the date of the encrypted disclosure.

While the e-design notebooks utilized by the Ecosystem for Learning and Team do employ a secure timestamp, they differ from (Kross 2001) and (Bogan 2003) in the structure assumed. The e-design notebooks are structured in a special way that allows the e-design process to automatically assess the quality of design activities relative to the stages in the design process.

Native, Hybrid and HTML5 Applications for Mobile Devices (Wouhaybi 2014) and (Low 2014) constitute recent prior art on native, hybrid and HTML5 applications for mobile devices. (Wouhaybi 2014) outlines a system, including apparatus, methods and computer programs, for running native software applications (apps) and HTML5 web-based apps on a computing device, particularly a mobile computing device, in a multitasking mode of operation. (Low 2014) describes a particular implementation of the hybrid app concept. The current invention differs from (Wouhaybi 2014) and (Low 2014) in the sense that the invention does not address the internal structure of the apps themselves, but identifies and proposes deployment of the most suitable app type for the Ecosystems in question.

Handwriting Recognition Running on a Centralized Server (Chinese 2011) and (Dai 2014) offer the closest analogue to handwriting recognition systems running in a cloud or on a VPS. (Chinese 2011) presents a cloud computing-based mobile terminal handwriting identification method. This particular patent application may have been discontinued, in part due to lack of unique features (the application does not offer much more than the generic concept). There is little to nothing about optimization, or implementation-specific, techniques (how to the mask delay, how to identify partitions of minimal sufficient size, how to generate stylus strokes from partitions from raster images, etc.). (Dai 2014) is aimed at contextual searches using text determined based on digital-ink data. It mentions the Microsoft's digital ink framework. The application notes the digital-ink data can be written as handwriting, or a similar style, and can be translated into text. (Dai 2014) presents exemplary computing devices that can perform the contextual searches based on the digital-ink data. While "a cloud" is listed as an exemplary implementation environment, the exposition is very generic (few specifics offered on the cloud implementation). Again, there is little to nothing here about optimization, or implementation-specific, techniques (how to the mask delay, how to identify partitions of minimal sufficient size, etc.). There is no mention of how the digital-ink paradigm can be applied to generate stylus strokes from minimal partitions derived from the raster images. And there is no mentioning of cross-platform applications (applications to mobile operating systems with Android, iOS, FFOS, Windows, etc.). Furthermore, (Dai 2014) makes no mention of using the proposed paradigm for offering handwriting recognition as service. The main emphasis is on the contextual searches.

(Chinese 2013b) and (Lemmey 2013) comprise another set of prior art worth mentioning. (Chinese 2013b) outlines a system and method for handwritten input. The handwriting input system includes a terminal device and a cloud server. The terminal device is provided with an input unit, a local recognition unit, an integration unit for the recognition result of and a display. Without providing a whole lot of detail on how the recognition is accomplished, the patent does indicate it is through some sort of fusion of local recognition results and "the results in accordance with the clouds sort of character recognition confidence fusion". The patent does not make any mention of cursive handwriting, but it does mention character recognition. This leads one to believe the methods are restricted to the recognition of isolated characters (perhaps only from Cantonese or Mandarin?). Furthermore, there is little to nothing about optimization or implementation techniques.

(Lemmey 2013) presents an invention that contemplates a variety of methods and systems for providing a drawing layer synchronized across multiple artists and devices, wherein the drawing layer can provide a computer interface for an artist. Handwriting recognition and cloud computing is briefly mentioned in passing, but no details provided. The claims only mention character recognition, which again leads one to assume that the invention is restricted to the recognition of isolated letters (not of cursive handwriting).

REFERENCES (Takatsuka 2006) A. Takatsuka, N. Tatalovich, J. Greene, F. Hayes and D. Whelan. Team collaboration system with business process management and records management. United States Patent Application Publication No. US 2006/0085245 A1. Apr. 20, 2006.

(Rodriguez 2008) W. Rodriguez, A. Opdenbosch, D. S. Carstens, B. Goldiez, S. M. Fiore and V. Kepuska. System and methods for facilitating collaboration of a group. United States Patent Application Publication No. US 2011/0134204 A1. Jun. 9, 2011.

(Hetrick 2008) W. A. Hetrick. Method and apparatus for managing virtual team collaboration meetings. United States Patent Application Publication No. 2008/0077416 A1. Mar. 27, 2008.

(Packbier 2014) R. Packbier, P. Kemp. Tracking device and method for very large-scale software development projects. U.S. Pat. No. 8,739,113 B2. May 27, 2014.

(Huben 1999) G. A. v. Huben and J. L. Mueller. For managing multiple projects as a design control system. U.S. Pat. No. 5,920,873 A, Jul. 6, 1999.

(Hiroaki 1999) Hiroaki c/o Toyota Caelum Incorporated Sano. CAD system for team-based design. European Patent Application No. EP0947961 A2, Oct. 6, 1999.

(Sano 2002) H. Sano. CAD system for team-based design for managing undo and redo functions. U.S. Pat. No. 6,377,964 B1, Apr. 23, 2002.

(Belluomini 2002) W. Belluomini, J-A Carballo, N. Donofrio, R. Montoye and K. Nowka. Method and system for managing innovation by encouraging reusability and subsequent reuse of design components. United States Patent Application Publication No. US 2002/0198773 A1, Dec. 26, 2002.

(Hekmatpour 2005) A. Hekmatpour. XML-based system and method for collaborative web-based design and verification of system-on-a-chip. U.S. Pat. No. 6,968,346 B2, Nov. 22, 2005.

(Staples 2006) P. Staples, Collaborative design process for a design team, outside suppliers, and outside manufacturers. United States Patent Application Publication No. US 2006/0253480 A1, Nov. 9, 2006.

(Brewer 2000) J. T. Brewer, C. M. Luffy, R. J. Luffy, C. R. Salay, J. M. Vishnauski, D. R. Wallace, M. R. Woodruff and J. L Younghans. System for evaluating designs. United States Patent Application Publication No. EP1056026 A2, Nov. 29, 2000.

(Damm 2006) C. H. Damm, K. M. Hansen, M. Thomsen and M. Tyrsted. Method for gesture based modeling. U.S. Pat. No. 7,096,454 B2, Aug. 22, 2006.

(Zhang 2007) Z. Zhang, R. Cutler, Z. Liu, A. Gupta and L. W. He. System and method for whiteboard and audio capture. U.S. patent Ser. No. 10/178,443 Aug. 21, 2007.

(Kritt 2011) B. A. Kritt, D. A Law, T. S. Mazzeo, E. S. Rodney. Recognition and capture of whiteboard markups in relation to a projected image. U.S. Pat. No. 7,880,719 B2. Feb. 1, 2011.

(Chinese 2013a) 邱波, 余新国. Smart pointer. China Patent No. CN202948609 U, May 22, 2013.

(Farouki 2014) K. Farouki. Whiteboard records accessibility. United States Patent Application Publication No. US 2014/0165152 A1, Jun. 12, 2014.

(Steingrimsson 2014) B. Steingrimsson. Recognition and representation of image sketches. United States Patent Application Publication No. US 2014/03132216 A1, Oct. 23, 2014.

(Holler 2014) R. Holler, I. Culling, R. Delwadia, P. Mamut, M. Crowe, D. Hanson and P. Boudreaux. Integrated planning environment for agile software development. U.S. Pat. No. 8,739,047 B1, May 27, 2014.

(Kross 2001) R. L. Kross, A. B. Wagreich, G. A. Stark, D. L. Gill, D. G. Comfort and W. E. Bogan. Electronic notebook for maintaining design information. U.S. Pat. No. 6,285,369 B1, Sep. 4, 2001.

(Bogan 2003) W. E. Bogan, D. G. Comfort, D. L. Gill, R. L. Kross, G. A. Stark, A. B. Wagreich. Electronic notebook for maintaining design information. European Patent No. EP0959421 B1, Jul. 30, 2003.

(Koplow 2010) J. P. Koplow. Public encrypted disclosure. United States Patent Application Publication No. US 2010/0088521 A1, Apr. 8, 2010.

(Wouhaybi 2014) R. H. Wouhaybi and D. Shaw. Hybrid mobile interactions for native apps and web apps. United States Patent Application Publication No. US 2014/0282119 A1, Sep. 18, 2014.

(Low 2014) D. Low and A-L Hassenklover. Hybrid applications. United States Patent Application Publication No. US 2014/0109115 A1, Apr. 17, 2014.

(Chinese 2011) 何聪, 金连文, 高岩. Cloud computing-based mobile terminal identification method. China Patent Application Publication No. CN 201110048253, Jul. 13, 2011.

(Dai 2014) L. Dai, D. J. Hwang, Z. Anagnostopoulou, B. Westbrook, P. G. Davis and S. Viswanathan. Digital ink based contextual search. United States Patent Application Publication No. US20140250143 A1, Sep. 4, 2014.

(Lemmey 2013) T. Lemmey, N. Surin and S. Vonog. Method and system for drawing. United States Patent Application Publication No. US20130014028 A1, Jan. 10, 2013

(Chinese 2013b) 邓超, 祁亨年, 朱军民. Hand input system and method. China Patent No. CN101976148 B, Oct. 16, 2013

(SmartBoard 2014) Smart Board. http://en.wikipedia.org/wiki/Smart_Board/. Nov. 27, 2014.

(Chandrasegaran 2013) S. K. Chandrasegaran, K. Ramania, R. D. Sriram, I. Horvath, A. Bernard, R. F. Harik and W. Gao. The evolution, challenges, and future of knowledge representation in product design systems. Computer-Aided Design. Vol. 45, p. 204-228, 2013.

(Cloud 2014) Cloud Computing. http://en.wikipedia.org/wiki/Cloud_computing, Nov. 27, 2014.

(iOSBenchmark 2014) Geekbench Browser. iOS Benchmarks. http://browser.primeatelabs.com/ios-benchmarks/, Nov. 27, 2014.

(AndroidBenchmark 2014) Geekbench Browser. Android Benchmarks. http://browser.primatelabs.com/android-benchmarks, Nov. 27, 2014.

(OpenCV 2014) SourceForge. OpenCV 2.4.10 for Android. http://sourceforge.net/projects/opencvlibrary/files/opencv-android/2.4.10/, Nov. 27, 2014.

(iOSCameraAPI 2014) iOS Developer Library. Taking Pictures and Movies. https://developer.apple.com/library/ios/documentation/AudioVideo/Conceptual/CameraAndPhotoLib_TopicsForIOS/Articles/TakingPicturesAndMovies.html, Dec. 3, 2014.

(AndroidCameraAPI 2014) Android Developers. Camera. http://developer.android com/guide/topics/media/camera.html, Dec. 3, 2014.

(WindowsCameraAPI 2014) Windows Dev Center. How to create a base camera app for Windows Phone 8. http://msdn.microsoft.com/en-us/library/windows/apps/hh202956%28v=vs.105%29.aspx, Dec. 3, 2014.

(InkAPIs 2014) Windows Dev. Center. Pen Input, Ink and Recognition. http://msdn.microsoft.com/en-us/library/windows/desktop/ms700664(v=vs.85).aspx, Nov. 27, 2014.

(QtWebApp 2014) Stefan Frings. QtWebApp HTTP Server in C++. http://stefanfrings.de/qtwebapp/index-en.html, Dec. 3, 2014.

(Tufao 2014) Tufao. An asynchronous web framework for C++ built on top of Qt. https://github.com/vinipsmaker/tufao, Dec. 3, 2014.

(SMTP 2014) Simple Mail Transfer Protocol. http://en.wikipedia.org/wiki/Simple_Mail_Transfer_Protocol. Nov. 29, 2014.

(SVG 2014) Wikipedia. Scalable Vector Graphics. http://en.wikipedia.org/wiki/Scalable_Vector_Graphics, Dec. 3, 2014.

(LATEX 2014) LaTeX. A Document Preparation System. www.latex-project.org, Dec. 3, 2014.

(MIKTEX 2014) MikTeX . . . typesetting beautiful documents . . . http://miktex.org, Dec. 3, 2014.

(REST 2014) Wikipedia. Representational State Transfer. http://en.wikipedia.org/wiki/Representational_state_transfer, Dec. 3, 2014.

(JSON 2014) Introducing JSON. http://www.json.org/, Dec. 3, 2014.

(aStudio 2014) Android Tools Project Site. Android Studio Downloads. http://tools.android.com/download/studio, Dec. 3, 2014.

(SimpleHTTP 2014) A Simple HTTP Server. http://doc.qt.digia.com/solutions/4/qtservice/qtservice-example-server.html, Dec. 3, 2014.

(Timestamp 2014) Wikipedia. Trusted Timestamping. http.//en.wikipedia.org/wiki/Trusted_timestamping/, Dec. 3, 2014.
(LibAssoc 2000) American Library Association. Information Literacy Competency Standards for Higher Education. Chicago, Ill.: American Library Association, 2000.
(ABET 2012) ABET. Program Assessment Workshop. St Louis: ABET, 2012.
(ASEE 2011) Ruth Wertz, et al., et al. Information Literacy Competency Standards for Higher Education. ASEE Annual Conference. Vancouver, BC, Canada, 2011.
(ASEE 2008) Stephen Ekwaro-Osire, I. Afuh and P. Orono. Information Gathering Activities in Engineering Design. ASEE Annual Conference & Exposition, Pittsburgh, Pa., 2008.
(Davis 2000) D.C. Davis. Measuring learning outcomes for engineering design education. American Society for Engineering Education Annual Conference, 2000.
(Dym 2005) C. L. Dym. Engineering design thinking, teaching, and learning. Journal of Engineering Education, Vol. 94, pp. 103-120, January 2005.
(Oracle 2014) Oracle. Java SE Development Kit. http://www.oracle.com/technetwork/java/javase/downloads/index.html, Dec. 3, 2014.
(AndroidSDK 2014) Android Developers. Get the Android SDK. http://developer.android.com/sdk/index.html, Dec. 4, 2014.
(VisualForce 2014) SalesForce Developers. Native, HTML5, or Hybrid: Understanding Your Mobile Application Development Options. http://wiki.developerforce.com/page/Native, _HTML5_or_Hybrid:_Understanding_Your_Mobile_Application_Development_Options, Dec. 4, 2014.
(Xamarin 2014) Wikipedia. Xamarin. http://en.wikipedia.org/wiki/Xamarin, Dec. 4, 2014.
(GIT 2014) S. Chacon and B. Straub, Pro Git. http://git-scm.com/book/en/, Dec. 4, 2014.

SUMMARY OF THE INVENTION

To address limited capabilities for interactive team design, amidst thrust for enhanced productivity (shorter design cycles), unlocking creativity and for high quality, this invention presents an Ecosystem for Team Design and Collaboration (FIG. 2) as well as an Ecosystem for Learning and Team Design (FIG. 3). The Ecosystems are presented to make organizations involved in design or planning more productive as a whole, not only the individual design engineers. For this reason, the communication capabilities are essential, as well as the ability to integrate with CAD packages, FEA, DPM, CPD and PLM systems. The capabilities for handwriting recognition are then extracted from the two Ecosystems and combined into an Ecosystem with Specialized Capabilities for Handwriting Recognition (FIG. 13).

1. Ecosystem for Team Design and Collaboration

In the Ecosystem for Team Design and Collaboration, attendees to meetings, such as design, planning or brainstorming meetings, can exchange ideas and express themselves by drawing image sketches onto a whiteboard or a notepad. The attendees do not necessarily have to be engineers, but may include managers, executives, architects or other professionals. At the end of (or during) a given meeting, an attendee can take an image of the whiteboard or notepad, using an image sensor (for example in a smartphone, tablet or a convertible laptop) and denote the 'area of interest'. The attendee can then convert the image sketch into vector graphics (stored as SVG) and offload to a cloud system. From there, other attendees and team affiliates (with the proper access privileges), located off-site or on-site, can access the data, and offer feedback, for example by e-mail. Or by importing the vector graphics directly into formal project reports or presentations, they can make use of the content for the purpose of creating 'presentable entities'. There is no need to redraw in MS Visio, CorelDraw, LibreDraw, OmniGraffle or similar tools.

The mobile clients are essential to the Ecosystem for Team Design and Collaboration. The mobile clients are responsible for capturing the image data, preprocessing (for defining 'areas of interest') as well as for handling (significant) portion of the recognition. The mobile clients assume the user specifies two opposite corner points of a rectangle denoting 'areas of interest', and hence eliminates artifacts impeding accurate recognition, such as shadows from neighboring objects, sunlight glare through a neighboring window, angular perspective or non-white color of the background wall. Software running on the mobile clients, but with ability of showing advertisements, may be offered free of charge.

Team members or other stakeholders, located on-site or off-site, can access material from the planning, design or brainstorming meetings by connecting to the cloud system through remote nodes. They can utilize multiple $3^{rd}$ party applications for accessing the meeting material (in particular, the SVG graphics). The recognition functions, handled locally on the mobile clients (as permitted by the processing power and battery life time available), except for the handwriting recognition, or on the cloud server, are expected to result in beautified images (kinky or quirky lines made straight, etc.).

These same recognition algorithms are also capable of generating vector representations of imagery content obtained from raster images produced by "smart" whiteboards (see for example (SmartBoard 2014)).

The Ecosystem for Team Design and Collaboration enhances productivity by providing seamless communication, remote access and by eliminating the need to redraw.

2. Ecosystem for Learning and Team Design

The Ecosystem for Learning and Team Design assumes that students or design engineers receive, or bring, a mobile computing device, such as a tablet PC, at the beginning of a design project, take all of their notes on the tablet, create their design drawings, upload their documents to a cloud server, seamlessly share selected designs with their teammates, and communicate with their supervisor or mentor, or with other class mates, subject to (configurable) restrictions.

Central to the Ecosystem is the architecture outlined in FIG. 6 and FIG. 7. The architecture comprises of seven main modules: Outcomes, data collection, data mining, assessment, evaluation, decision and communication. The Ecosystem and its assessment engine, the e-design process, have been designed to improve the teaching, learning and practice of design processes. The e-design process is a continuous improvement process that is applied to each page of standardized e-design notebook generated by the user (student or practicing engineer) as the user progresses to develop a solution for their design problem. Based on well-defined learning outcomes, and corresponding performance indicators, the Ecosystem processes each page of the e-design notebook and then transmits a guiding, real-time advisory to the student or engineer, as well as to the instructor or mentor. (The configuration also allows access by a supervisor, if desired). The advisory serves to ensure compliance with the design process and minimize the chance of design oversights. In other words, this innovation provides structures that allow the user to pursue problem solving in methodological fashion.

The Ecosystem for Learning and Team Design is a complete all-electronic design environment that uses pages out of electronic design notebooks to perform assessment and evaluation of the outcomes from the design activities, originating from any of the five stages of the design process (FIG. 1). It has the unique capability of being able to automatically assess the quality of the design activities, relative to the design process. To many, this might come across as being an impossible task. It is the only learning tool capable of assessing all the five stages in the design process. Most design environments constitute several different tools that only address a few of the five stages (Chandrasegaran 2013). The Ecosystem for Learning and Team Design also offers individualized learning to the digitally sophisticated millennials by allowing customized configurations of the mobile devices to suit different learning styles.

This innovation derives further benefits from the following:

1. The real-time notifications increase the chance of the users staying on track throughout their design projects, resulting in final designs of higher quality and shorter time to market.
2. The system provides the users with a way to harvest their creativity by enabling quick explorations of variations of key design ideas. The vector objects provided can be easily moved around, deleted or new objects added (no need to redraw the design from scratch).
3. The generic design paradigm allows mentors, instructors or supervisors to assess the engineers' (students') performance with higher quality, less subjectivity, and on continual basis.
4. Higher quality teaching and training results from more rapid response from the mentors, instructors or supervisors. This provides them with enhanced ability to spot design pitfalls and get the engineers (students) back on track.
5. The Ecosystem can be configured such that the practicing engineers, or students, are incentivized to make the most of the tool and maximize the productivity enhancements associated with each real-time advisory (the pitfalls averted). It is not only the organization that benefits from the productivity enhancements. Assuming the engineer would confirm the advisories or correct, a log with the estimated productivity enhancements could be made accessible to the engineers and management, and could be one of the components factoring into the performance review of the engineers. Similarly, while the proposed design paradigm is not envisioned as a grading tool, it can be configured to produce one of the factors influencing the overall grade for a given student design project.
6. The ecosystem architecture is quite flexible: Its assessment engine, the e-design process, is modular and can be offered stand alone, depending on the customer infrastructure available. Or it can be integrated into electronic lab notebooks, for example as a plug-in, if desired.
7. Flexibility in the selection of the mobile clients: Engineers can select Windows-based devices (convertible laptops or tablets), probably for legacy reasons (due to enhanced capabilities for interfacing with established development tools), while students can opt for the cheaper Android tablets, or even iPads.
8. Flexible system configurations: The Ecosystem can be configured, for instance, as a management tool, facilitating seamless and expeditious reports and responses related to the design activities.
9. Flexible and versatile e-design notebooks: The notebooks can tell a story that starts with high-level conceptual sketches and product development specifications, and progresses through engineering design, where much more sophisticated drawings and details are provided. In addition to the 2D sketches, they also can be extended to support complex, 3D design files, such as from AutoCAD, SolidWorks, CATIA or PTC Creo. With the secure time stamps provided, the e-design notebooks are expected to hold up in court.
10. Low-cost configurations available: These could be based on direct communications between users (without a cloud server, VPS, VM or a data center).
11. Compatibility with CAD tools, DPM systems, PLM and existing team design environments (CPDs). The Ecosystem for Learning and Team Design can interface with established tools for computer aided design or data product management.
12. Compatibility with other tools impacting the engineering design. The Ecosystem, for example, supports interface with FAE tools used to validate stress analysis.

3. Ecosystem with Specialized Capabilities for Handwriting Recognition

This Ecosystem extracts out the handwriting recognition from the Ecosystem for Team Design and Collaboration as well as the Ecosystem for Learning and Team Design, and offers the recognition capabilities as a service, stand-alone or in combination with other features.

Other aspects and features of the present invention will be readily apparent to those skilled in the art from reviewing the detailed description of the preferred embodiments in conjunction with the accompanying drawings.

The invention presents 12 primary use cases. The present invention is not restricted to these embodiments. Variations can be made herein without departing from the scope of the invention.

DETAILED DESCRIPTION OF THE PREFERRED EMBODIMENTS

1. Definitions

Figure 1:
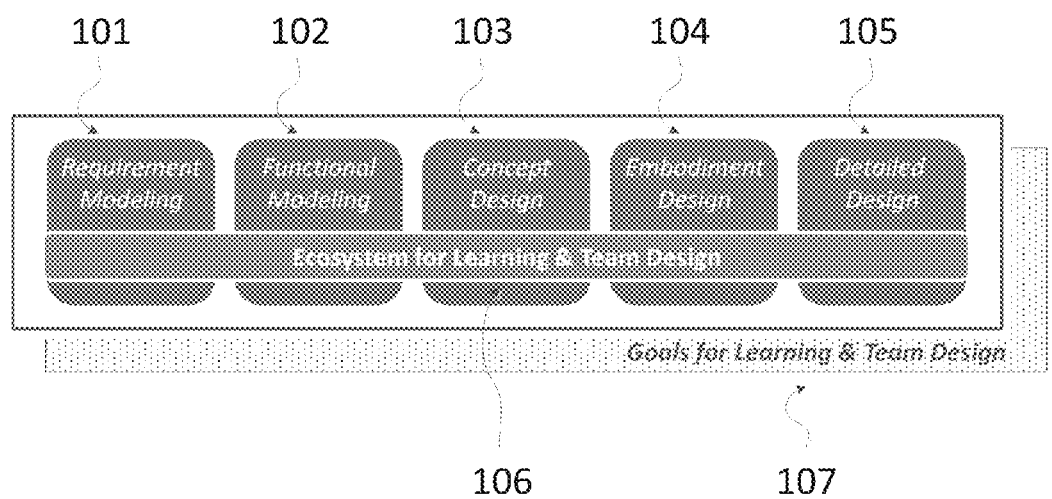
FIG. 1 defines the five stages comprising a design process and puts in perspective with the unique capabilities of the Ecosystem for Learning and Team Design.
Figure 2:
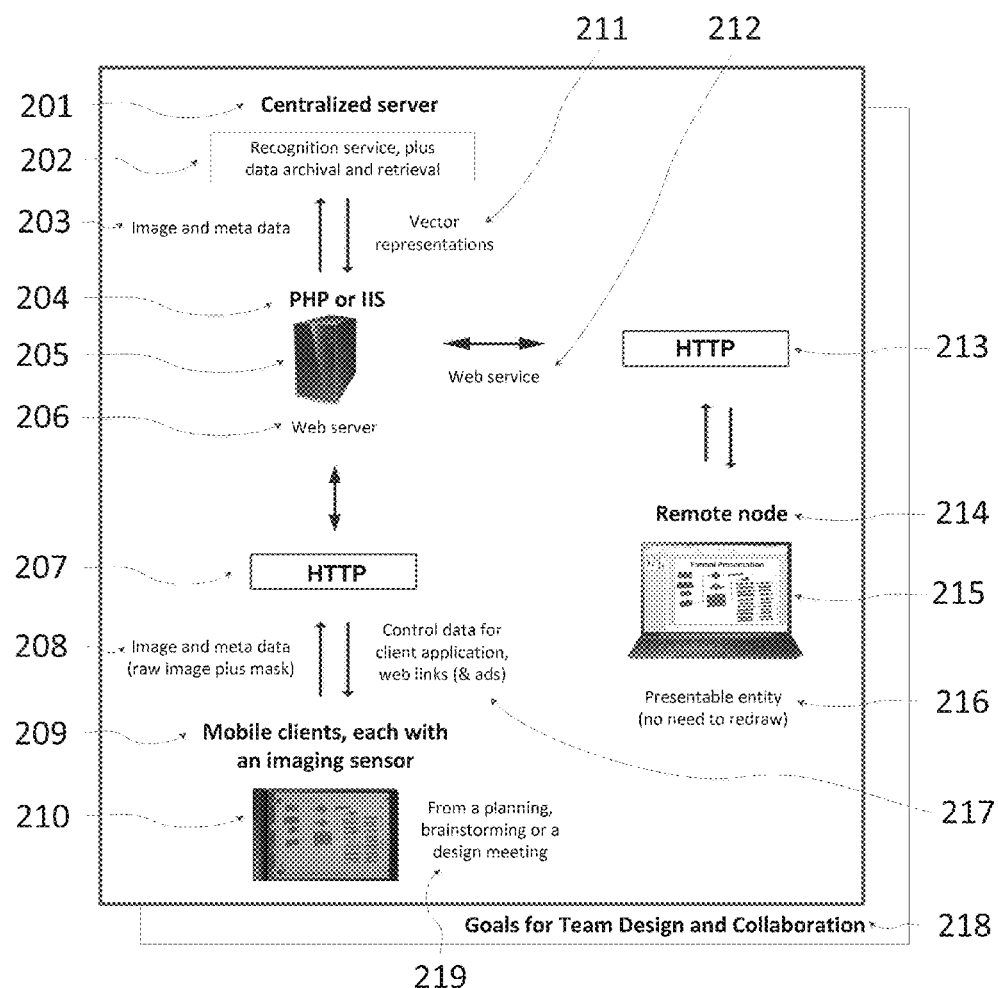
FIG. 2 presents the high-level architecture for the Ecosystem for Team Design and Collaboration.

Table 1 captures the primary definitions and acronyms used in the patent.

TABLE 1

Summary of the primary definitions and acronyms.

| Name | Definition |
|---|---|
| ADT | Android Development Tool |
| AI | Artificial Intelligence |
| API | Application Program Interface |
| App | Application Running on a Mobile Device |
| CAD | Computer Aided Design |
| CPD | Collaborative Product Development |
| CSS | Cascading Style Sheet |
| DPM | Data Product Management |
| ELN | Electronic Lab Notebook |
| FEA | Finite Element Analysis |
| FFOS | Full Featured Operating System |
| GUI | Graphical User Interface |
| HTTP | Hypertext Transfer Protocol |
| IIS | Internet Information Services |
| iOS | Mobile Operating from Apple Inc. (previously iPhone OS) |
| JDK | Java Development Kit |
| JNI | Java Network Interface |
| OS | Operating System |
| PLM | Product Lifecycle Management |
| PTC | Parametric Technology Corporation |
| REST | Representational State Transfer |
| RNN | Recursive Neural Network |
| SDK | Software Development Kit |
| STEM | Science, Technology, Engineering and Mathematics |
| SVG | Scalable Vector Graphics |
| VM | Virtual Machine |
| VPS | Virtual Private Server |
| XML | Extensible Markup Language |

2. Best Mode of the Invention

FIG. 2, FIG. 3, FIG. 5 and FIG. 6, FIG. 7 and FIG. 13 capture the best mode contemplated by the inventors, according to the concepts of the present invention.

3. How to Make the Invention

3.1 Ecosystem for Team Design and Collaboration

Essential System Functions

This innovation assumes the vendor, or the customer, host a web service interfacing with a VPS or a cloud system. The innovation assumes that the users deploy an app on their mobile clients that is capable of taking an image snapshot, running object recognition and communicating with a web service (see FIG. 2). As a result, the exact type of the VPS or cloud platform is of secondary importance. What matters is that the apps running on the mobile clients work as expected, that the clients can connect to and make use of the web service, and that the system is scalable (and economically viable). The entire architecture is formulated around this key premise.

The system delivers beautified vector graphics in SVG format. There are two preferred embodiments of the applications running on the mobile clients:

(a) A free (light) version capable of displaying advertisements.

(b) An enhanced, ad-free version offered for purchase.

The recognition of the graphical objects (but not the handwritten text) runs locally, by default, to make the maximum use of the resources available on the mobile clients. While the architecture has provisions to offload selected recognition assignments to the VPS or cloud, the latter would—in the ideal case—be mainly used for data archival, and for executing the handwriting recognition. Storage space on cloud servers tends to be relatively cheap, at the present time.

Key Assumptions

1. Definition of the "Cloud": Possible Overlaps Between the "Cloud" and a Corporate Intranet The cloud is here simply defined as a large group of remote servers that are networked to allow centralized data storage and online access to computer services or resources (Cloud 2014). Given this generic definition, the cloud can encompass the corporate intranet of a given organization, but does not have to. The overlap can vary.

2. Local Recognition on the Clients, but Archival in Virtual Servers or the Cloud This invention assumes the recognition of the graphical objects (but not the handwritten text) is run locally on the clients, as much as resources allow, in part to minimize expense associated with renting computing resources on the server side, but also to minimize the communication overhead. With smartphones becoming ever more powerful (iOSBenchmark 2014)-(AndroidBenchmark 2014), in terms of computing capabilities, this is a feasible proposition. By contrast, offloading large computing assignments to the cloud can be expensive, esp. if this needs to be done for a large number of users. The economy of scale is disadvantageous.

3. First Local Recognition Through Native Apps, but Ultimately Through Hybrid Apps This invention assumes native applications are developed for initial deployment on the mobile clients. The native apps provide full access to the device API, and—for any given platform —pave the way of least resistance to an initial prototype. In the cases of the Android and iOS operating systems, an OpenCV computer vision library is also available (OpenCV 2014). This invention assumes development of hybrid apps with some leaning towards HTML5, for ultimate deployment across a variety of mobile platforms. Hybrid applications make sense for the purpose of utilizing a single code base across a plethora of mobile platforms.

Application Running on the Mobile Clients with the Imaging Sensor 209, 210

1. Typical Use Case

A typical use case consists of the following, primary steps:

1. User takes an image snapshot of the whiteboard.

The app comes with a seamless user interface that provides means for taking the image snapshot and preprocessing (specifying mask area), if necessary.

2. Through the user interface, the user initiates recognition of the graphics, text and/or equations.

The recognition is carried out locally on the client (if resources allow), except for the handwriting recognition, or offloaded to a VPS or cloud. This is transparent to the user.

3. The vector graphics recognized is displayed on the mobile device.

The user can store the image locally as SVG, do some touch-up (if desired) or upload to VPS or cloud (if the recognized image is deemed of high enough quality).

The mobile clients may consist of tablets, smart phones or convertible laptops. Non-convertible laptops are likely not to support a stylus, and hence cannot allow the user to specify the corner points of the mask area needed for accurate recognition.

In case of "smart" whiteboards, the user does not need to snap an image. The sketch recognition can be applied directly to the raster image produced by the whiteboard (Steingrimsson 2014). This is expected to result in higher recognition accuracy, since the environmental artifacts (reflections, shadows, etc.) have now been eliminated.

2. The Overall Architecture

The software architecture relies on APIs that are available on the iOS, FFOS, Android and Windows systems, for utilizing the camera (iOSCameraAPI 2014)-(WindowsCameraAPI 2014). The architecture assumes a web-back end that activates the camera API and stores the picture into a processing queue. The processing queue is scanned, and when a picture is detected, the recognition engine is launched. The recognition software will look for the picture in a standardized folder (/pre-recognized) and place the vector graphics recognized in another standardized folder (/complete). The recognition engine has its own API which is outlined in (Steingrimsson 2014). (Steingrimsson 2014) also describes the internal structure of the recognition engine, including the dependency and class diagrams.

The software application can be made using the same tools as used to make the mobile application for the Ecosystem for Learning and Team Design.

2. Image Preprocessing on the Client Side

Various types of artifacts can impede accurate recognition of the whiteboard images, as briefly noted above. These include non-ideal lighting conditions or perspective, sunlight glare, shadows from neighboring objects, color of the background wall or even the material characteristics of the whiteboard. Ideally, the snapshot should be taken head on, to avoid slanted perspective. Central to the invention is the ability of the mobile clients to suppress these artifacts, and hence significantly improve the recognition accuracy, through a hybrid approach comprising of the following steps:

1. The user specifying mask area to define the 'area of interest' (see FIG. 4).

To this end, the user simply needs to tap on opposite corner points of the image.

2. The user utilizing flash light, diffuser and/or photo illuminator, configured per recommendations.

3. The user complying with the general recommendations from the User Guide of the vendor, with regards to desired distance from the whiteboard, slanted perspective, minimum (and maximum) resolution desired, etc.

3. Object Recognition on the Client Side

The preferred embodiment of the invention assumes the object recognition is carried out on the client side, per stipulations of (Steingrimsson 2014). But through load balancing, heavy-duty recognition assignments can be offloaded to the VPSs or the cloud. The beautification process, such as alignment or straightening of objects and lines, is included in the object recognition, as a post-processing step.

4. Handwriting Recognition

The Ecosystem for Team Design and Collaboration is capable of recognizing handwritten text, both cursive handwriting and isolated letter, in the whiteboard images with high accuracy. The preferred embodiment assumes the handwriting recognition is offloaded from the mobile devices and run in a cloud system, on a VPS, VM or in a data center. The recognition algorithms running on the server are assumed to rely on the Ink Collection, Ink Data Management and Ink Recognition APIs (InkAPIs 2014). The primary benefit here pertains to the ability to deploy a single recognition solution across multiple mobile platforms (Windows, Android, iOS, FFOS, etc.)[1]. The Ecosystem provides a user friendly way of correcting errors (through only a few clicks). The separation of the complete words into constituent letters is, in general, one of the greatest challenges of cursive handwriting recognition.

[1] Note that (InkAPIs 2014) is only available on Windows-based platforms. One cannot apply this solution to platforms running the Android, iOS or FFOS operating systems, unless the Ink framework runs on the server side.

Since the Ink Recognition API assumes stylus strokes as input (not bitmap images), two essential preprocessing steps are required:

1. Partitioning the input image into partitions of "minimally sufficient" size.

5. We are looking for the smallest sub-area from the input image that constitutes a complete word.

2. Applying a segmentation procedure to the each sub-partitions, to produce the stylus strokes (i.e., connected segments).

6. The segmentation can be accomplished, for example, by applying the findContours( ) function of OpenCV (OpenCV 2014).

Each minimal set of stylus strokes is then sent to the recognition API as an isolated chunk.

It is of paramount importance to minimize, and compensate for (mask), the latency introduced when transmitting the stylus strokes to the server, waiting for the server to run the recognition and to return the results. The overall goal is to configure the recognition such that it does not impact the user experience (productivity). The processing delay depends heavily on what data is transmitted exactly. As long as the data is available by the time the user needs it, the user experience is not impacted, and the user likely does not mind about the delay, even though it is a second or two.

To this effect (to minimize the processing delay), the algorithm for generating the partitions of minimum sufficient size from the input image is structured as follows:

1. The algorithm starts out by applying contour analysis on the input image (using findContours( ) in OpenCV).
2. The smallest contours (residuals) are suppressed.
3. The remaining contours are analyzed and matched against a dictionary containing the letters and words.

4. When known letters, but incomplete words, are recognized, the algorithm looks for contours to combine (in an effort to identify complete words). The following principles apply to this association of contours:
   a. The algorithm looks for contours whose position aligns with the extrapolated baseline of the original contour.
   b. The maximum spacing between the original contour and the new, associated contour cannot exceed (3*(the average letter width identified so far)).

Certain functions, related to the recognition, still reside on the mobile clients, such as rendering of the recognized text.

For optimization on the server side for masking the latency, the Ecosystem for Learning and Team Design is, further, designed to support routing based on IP address of the client to the server with the closest physical proximity.

7. Equation Recognition

Proper recognition of the equations in the whiteboard images is an arduous task, in part because the equations do not adhere to regular line structure. The symbols may be to the side, on top or towards the bottom with respect to one another. At a high level, the equation recognition is founded on a 'divide-and-conquer' strategy, focusing first on identifying the 'primary separators' ('=', '≥', '≤', '≈', '≠', '<', '>' and '≡') then the 'secondary separators' ('+', '−', '*' and '%'), and finally on analyzing the constituent elements.

8. Communication Facilities on the Client Side (the Web Client)

For communicating with the cloud, VPS or the remote nodes, this invention assumes the mobile clients support a cross-platform web client developed in Qt (C++), with QtWebApp (QtWebApp 2014), or with the Qt-based Tufao asynchronous web framework (Tufao 2014). Depending on cloud, VPS or native application frameworks, the invention also has provisions for supporting .NET WCF web services written in C# or ASP .NET Web API.

Alternatively, for transmitting the vector graphics, the clients can utilize a back-end e-mail relay server (refer to the free software listed in (SMTP 2014)). The communication software looks for the recognized vector graphics in one of the standardized folder (/complete).

9. Preserving Battery Life

While the processing power and memory resources of mobile devices have increased dramatically in recent years, the battery resources have not changed much. It is not only the local execution of the recognition operations that can significantly impact the battery life. The networking components also consume battery resources. Preservation of battery life boils down to limiting the extent of local recognition (number and complexity of the recognition functions as well as size of the partitions recognized at one time), while at the same time minimizing the data transmitted on the wire (for example by transmitting condensed meta-data as opposed to the raw data). Specifically, if battery life is below a given threshold, the recognition assignments are offloaded to a server. In this case, the whiteboard image is pre-partitioned, based on Euclidean proximity, and the partitions transmitted individually (compressed, if necessary).

Software Running on the Remote Nodes 214, 215

The operators of the remote nodes can be attendees to the planning, design or brainstorming meeting, on-site team members not able to attend the meeting due to a conflict, or even individuals working for the same organization but physically located in another continent. The remote nodes are capable of accessing the beautified vector graphics, of directly importing the graphics into 3rd party word processing, presentation or drawing applications for creation of 'presentable entities' (no need to redraw), of conducting corrections, revisions or touch-up of design files, or of communicating feedback on design sketches back to the meeting attendees, team members or stakeholders. In terms of communications between the remote nodes and the cloud (or virtual servers), analogous principles apply as for the communications between the mobile clients and the cloud.

1. Multiple 3$^{rd}$ Party Applications

The object recognition engine outputs vector graphics in the SVG format. SVG is an open-source format which is widely deployed and recognized as being quite stable (SVG 2014). The user can import the SVG files into MS Visio and copy into MS Word or Powerpoint. Alternatively, the user can open up the SVG files up in LibreDraw (under Linux), OpenOffice or in any of the primary web browsers available (FireFox, Chrome, Safari or the Internet Explorer).

2. Ability for Post-Processing

The user expects the recognized vector graphics to contain well aligned lines and objects. If the user is not satisfied with the beautification facilities provided, the user can, if desired, import the SVG vector graphics into MS Visio, Corel Draw, OmniGraffle, LibreDraw, or other 3rd party drawing applications, for further post-processing (touch-up).

3. Elegant Vector Representations

TeX is the ultimate goal in terms of elegant vector representations of text, graphics and equations. LaTeX and MikTeX output postscript files capturing the vector structures (LATEX 2014), (MIKTEX 2014). The vector representation is specified through the API provided by the recognition engine (Steingrimsson 2014).

Software Running on the Web Server: The General Communication Paradigm (204-207)

1. General Configuration and Considerations

Of most importance is for the mobile clients to be able to communicate with the IIS or PHP web servers supported by the virtual servers or the cloud. The popular cloud vendors (Microsoft Azure, Google App Engine, IBM Cloud Services and Amazon Web Services) all support ASP.NET web servers from Microsoft running IIS or Apache web servers running PHP[2]. Whether hosted on premise or in the cloud, the web services offer a level of scalability (capability to support all the clients).

[2]For accuracy, PHP is not a web server but service supported by Apache, IIS and other web servers. Apache runs on all the mainstream operating systems, including Windows and Linux.

2. Security

The invention assumes the communications between the apps running on the mobile devices and the web services are 100% secure. One way to achieve this is for the customer to register accounts with the cloud or VPS provider in the customer's name during the set-up process and provide write privileges to the vendor of the Ecosystem. For the VPS and cloud scenarios, the vendor would not store the vector graphics of any customer on its servers, but archive in the VPS or cloud systems provided by Microsoft, Google, IBM or Amazon. Another way involves hosting the web service within a corporate intranet.

3. Rationale for Selecting HTTP

HTTP is tried and tested. HTTP offers good scalability and solutions for load balancing.

4. Implementation Specifics for HTTP

This invention assumes the REST standard is used for the messages themselves (REST 2014). REST services which return light weight objects complying with the JSON format (JSON 2014). All the standard programming languages support REST client libraries, enabling communications with the HTTP servers.

5. Support for Peer-to-Peer Communications

The Ecosystem for Team Design and Collaboration is able to support peer-to-peer communications. This is accomplished by furnishing all the web clients also with server code. One user activates a web server, from its client, which other clients can connect to (as long as they are on the same network). The web server can act as a broker/tracker.

Software Running on the VPS or in the "Cloud": Great Flexibility and Scalability 201 202

1. Cloud Systems Supported

This invention is not restricted to a single cloud framework. The invention accounts for all the popular cloud systems available (Microsoft Azure, Google AppEngine, IBM Cloud Services and the Amazon Web Services), since they support IIS and/or PHP.

2. Object Recognition on the Server Side

While each of the common cloud systems can be utilized to run the object recognition, the preferred embodiment assumes, for cost reasons, that the object recognition is run locally on the mobile clients, as much as hardware resources on the clients allow. The cloud has the advantage providing the owner full control over the recognition application. Software upgrades can proceed with minimum impact on the user population. One does not need to support a recognition engine for each of the multiple operating systems across the client population.

3. A Little Bit about Dynamic Load Balancing

The dynamic load balancing allows certain recognition assignments to be offloaded to the VPSs or cloud. The cloud possesses the ability to shrink or expand depending on the processing load required. Further means for load balancing are provided through the content delivery network of certain cloud providers (such as Amazon). All recognition is run 100% locally if WiFi access to the VPS or cloud sever is not available.

Preferred Embodiments for a Structured Approach to Large-Scale Deployment

1. Starting Out with a Native Application Running Locally

The simplest manifestation of the innovation assumes that native applications are deployed on the mobile clients and all recognition is run locally. The native application can be developed in Visual Studio, for Windows, or in Android Studio (aStudio 2014), in case of deployment on an Android platform.

2. Scaling Up to an In-House Server, Qt-Based Web Server and Native Apps

The next step involves the native app taking the image snapshot from the whiteboard and sending to a server residing locally at the customer's premise. The web server can be programmed in Qt (SimpleHTTP 2014), (QtWebApp 2014), (Tufao 2014), and can hook to an image recognition service in a fashion outlined in (Steingrimsson 2014). The app would fold the image as well as other relevant information into a POST request and send to the web server. The web server would extract the information from the POST request, forward to the image recognition module which in return would output the vector graphics. The vector graphics would be sent back to the client, for example, as e-mail and stored on the server.

3. Ability to Scale Further Up to a Virtual Private Server or Even a Data Center The next step up is consists of compiling the image recognition library onto Linux and renting a VPS host (presently at about $15-$20 a month through Amazon). The image recognition and data archival would be hosted on the VM machine as opposed to the in-house server. If additional processing power is necessary, one can easily scale up the number of VPS servers deployed, to a data center, and do the necessary load balancing.

4. Eventual Cloud Implementation (If Necessary)

The main advantage of scaling up from a VPS to a cloud implementation pertains to the processing power. There are greater resources available in the cloud. But on the other hand, these resources are quite a bit more expensive.

Generating Vector Graphics from Raster Images Produced by "Smart" Whiteboards

The methods and apparatus from (Steingrimsson 2014) can be utilized directly for the purpose of generating vector graphics from raster images produced by the "smart" whiteboards. From accuracy perspective, processing of the image directly from the whiteboard has great advantage, since the environmental artifacts (shadows, reflections, etc.) have been eliminated.

3.2 Ecosystem for Learning and Team Design

The Ecosystem for Learning and Team Design provides an all-electronic environment for design processes. It uses standardized electronic design notebooks, such as the "e-design notebook" in FIG. 5 and Table 1, to perform the assessment and evaluation of the outcomes of the design process activities. The pages from the e-design notebook are analyzed by the e-design process which consists of seven steps (outcomes, data collection, data mining, assessment, evaluation, decision and communication; see FIG. 6). This is a continuous improvement process, in the sense that each completed page from the e-design notebook is serviced, and the instructor, mentor or supervisor as well as the student or practicing engineer informed as to whether the attainment of the outcomes is sufficient or not. An improvement decision is made, before the next page is constructed. This is consistent with the stated goal of improving teaching and learning of the design process by assessing and evaluating the outcomes of the design activities captured in the design notebooks. The significance of the innovation is that it describes a complete all-electronic design environment. The innovation presents the only learning tool capable of assessing and evaluating all the five design stages (see FIG. 1).

Figure 3:
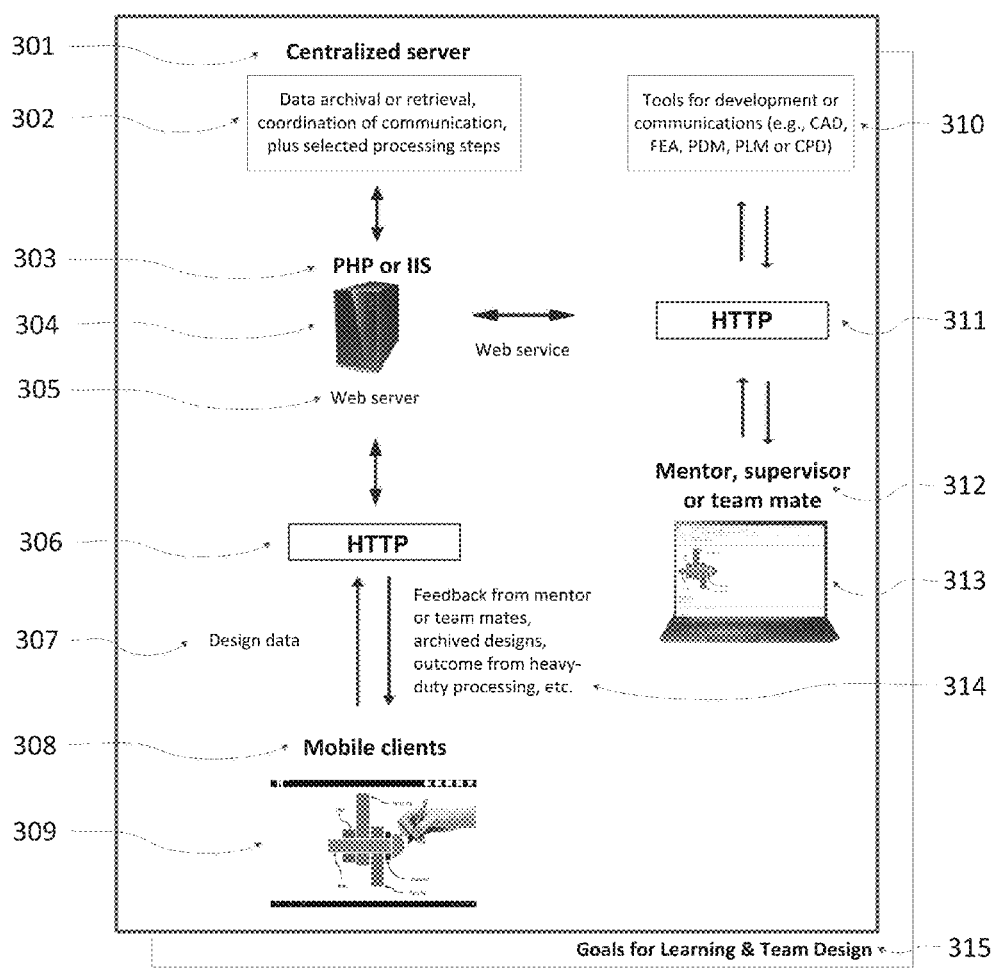
FIG. 3 summarizes the overall architecture for the Ecosystem for Learning and Team Design, both for the mobile clients and the cloud server.
Figure 6:
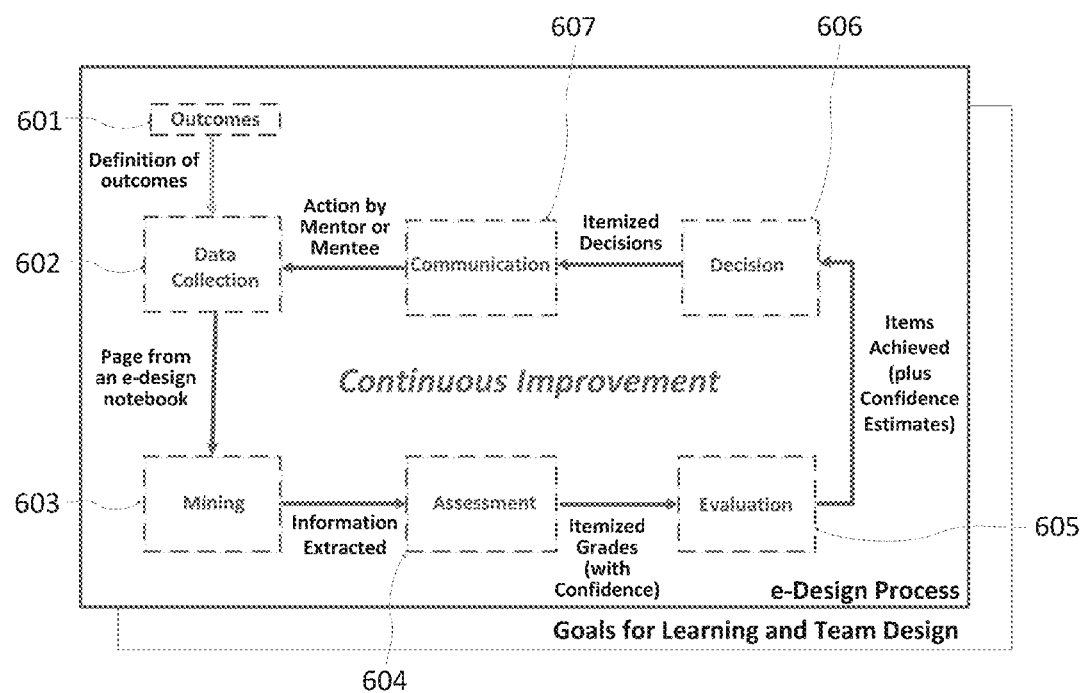
FIG. 6 presents a high-level abstraction of the e-design process, i.e., the architecture for the Ecosystem for Learning and Team Design running on the client side.
Figure 7:
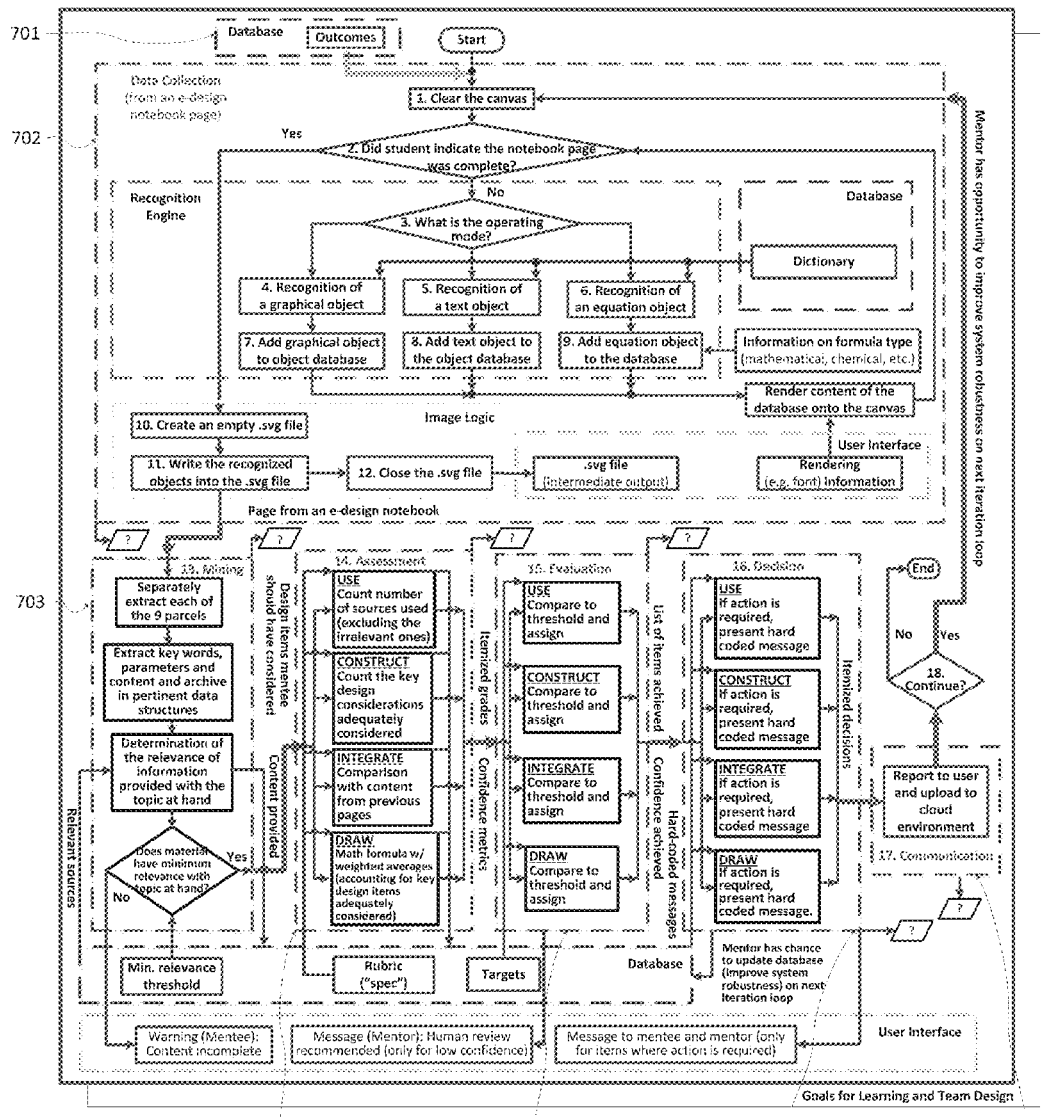
FIG. 7 presents the complete flow chart of the architecture for the Ecosystem for Learning and Team Design running on the client side.

There are two preferred embodiments:

(a) The complete Ecosystem (see FIG. 3, FIG. 6 and FIG. 7).
(b) The assessment engine, the e-design process, presented stand-alone as an add-on or plug-in to an electronic lab notebook or an existing ecosystem.

FIG. 7 outlines an embodiment of the overall mechanism, which includes a database access step (701), a recognition step (inside 702), an image logic step (also inside 702), a data mining step (703), an assessment step (704), an evaluation step (705), a decision making step (706) and a communication step (707). This mechanism resembles the one for the Ecosystem for Team Design and Collaboration. Within these primary steps, FIG. 7 also describes more detailed sub-steps, whose function can be appreciated by a person of ordinary skill in the art.

Large design organizations may have an established set of development and/or collaboration tools in place. They may prefer integrating the e-design process into an existing ecosystem.

With regards to the communications infrastructure for the Ecosystem for Learning and Team Design (303-306, 311), such as the selection of the communication protocol (HTTP), or the software running on the web server (the interface with the VPS or cloud), the same principles apply as for the Ecosystem for Team Design and Collaboration.

Standardized and Versatile e-Design Notebooks

Figure 5:
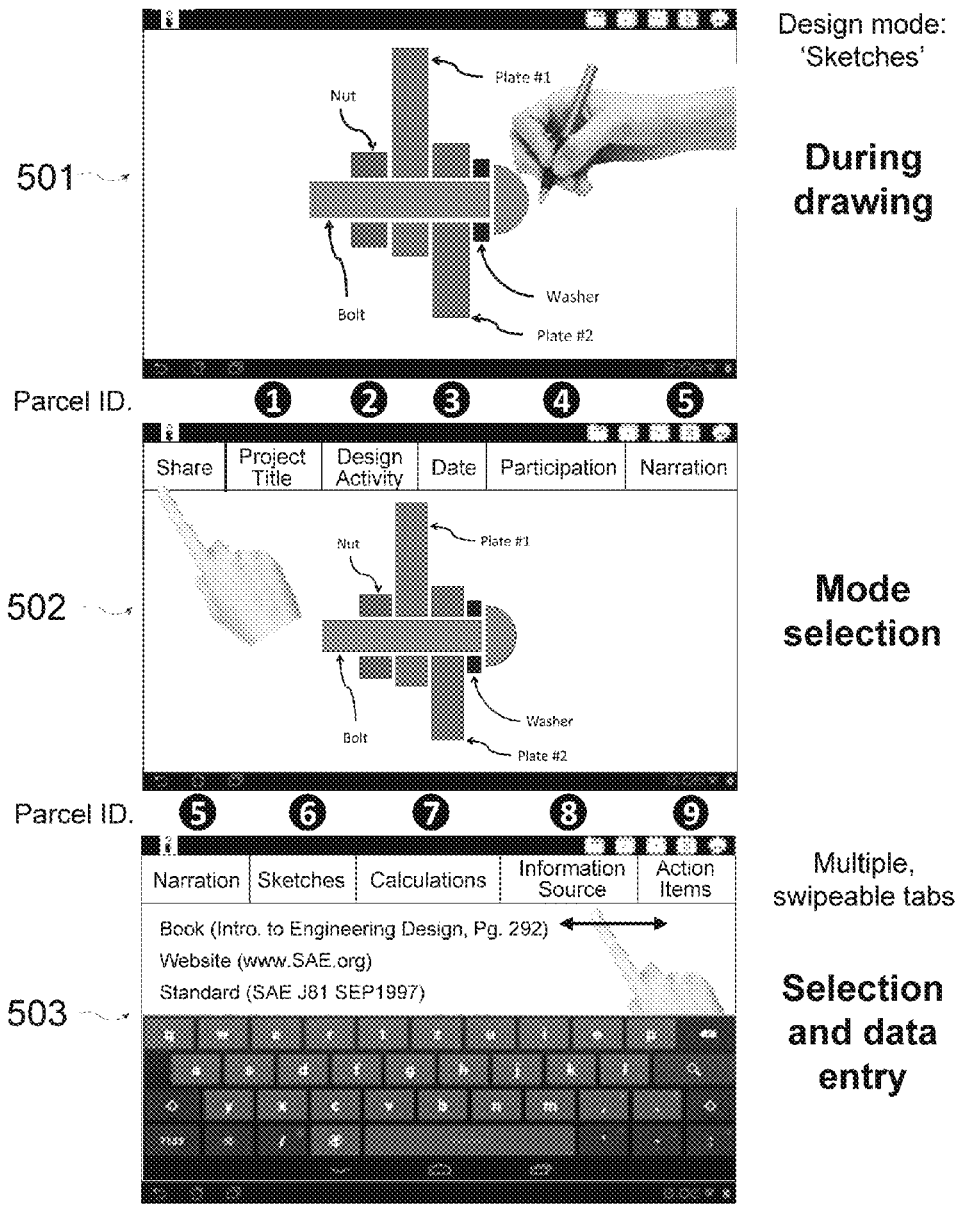
FIG. 5 captures rudiments of the graphical user interface for the Ecosystem for Learning and Team Design running on the mobile clients.

The layout and structure of the standardized e-design notebooks employed is outlined in FIG. 5 and Table 2.

TABLE 2

Sample content for a standardized e-design notebook.

| Parcel ID | Title | Sample Content |
|---|---|---|
| 1 | Project Title | Development of a Mechanical Connection between Two Steel Plates |
| 2 | Design Activity | Solution Generation |
| 3 | Date | (Sep. 01, 2013) 3.5 hrs |
| 4 | Participation | E.N.G.1, E.N.G.2 |
| 5 | Narration & Reflection | Developing of a solution for connecting two metal sheets, in a manner that they can be disassembled, so they can be replaced in case of damage or wear. System has to be capable of avoiding leakages because it will contain harmful substances. |
| 6 | Sketches | See FIG. 4 (401 and 402) |
| 7 | Calculations | Tightening Torque for a Bolt $$T = F_f \left\{ \frac{d_2}{2} \left( \frac{\mu}{\cos\alpha} + \tan\beta \right) + \mu_n \frac{d_n}{2} \right\}$$ |
| 8 | Sources of Information | See FIG. 4 (403) |
| 9 | Action Items | Choose bolt from catalog (E.N.G.1, E.N.G.2) What's the limit torque for the bolts? (E.N.G.2) |

Figure 8:
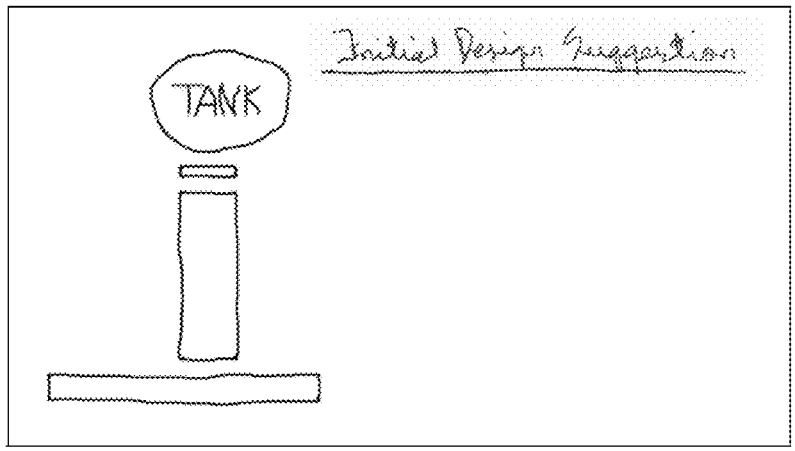
FIG. 8 shows how design notebooks can be used to tell a story that extends throughout the design project by capturing different levels of detail.
Figure 8:
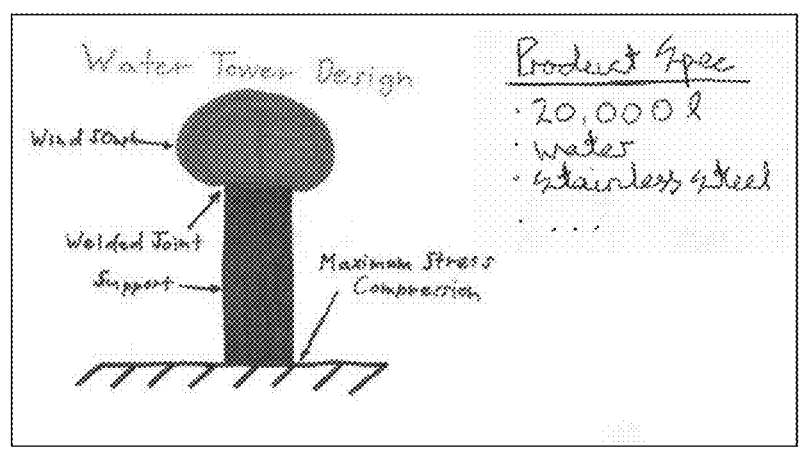
Figure 8:
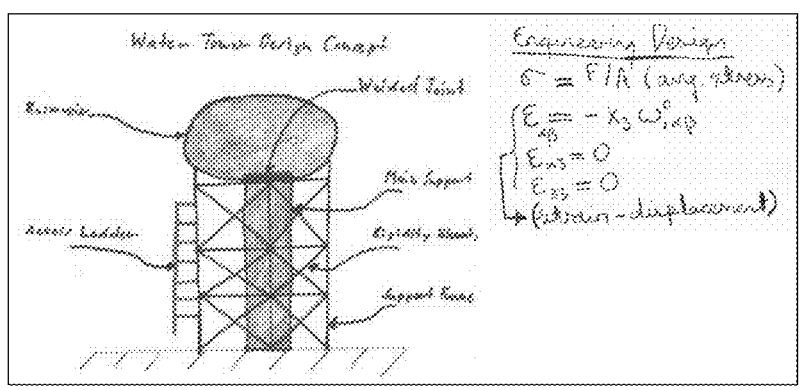

The e-design notebooks are quite versatile in the sense that they can tell a story that starts with high-level conceptual sketches and product development specifications, and progresses through engineering design, where much more sophisticated drawings and details are provided (see FIG. 8). The e-design notebooks can be extended to different stages of the design process. They also can be extended to capture sophisticated product requirements. And they can support complex, 3D design files, such as from AutoCAD, SolidWorks, CATIA or PTC Creo. Conceptually, there is no difference between mining and assessing 2D vector objects, stored in an SVG file, or more complex 3D objects. The e-design notebooks come, furthermore, equipped with secure time stamps which are expected to enable them to hold up in court (Timestamp 2014).

The e-Design Process

FIG. 6 presents a high-level depiction of the e-design process. The steps in the process are (1) Definition of outcomes,
(2) Data collection,
(3) Data mining,
(4) Assessment,
(5) Evaluation,
(6) Decision, and
(7) Communication.

The target outcomes are established only once. They are derived from the goals for the learning and team design. These goals are not a discrete step in the process, but impact most of the steps. Hence, it is shown as a separate layer in FIG. 6. Starting from the Data Collection, the five steps are executed for each data set collected. Each iteration constitutes a period of advancement towards developing a solution to the design problem.

e-Design Process Applied to Information Gathering

1. Outcomes 601, 701

The outcome that the students or practicing engineers are able to demonstrate at the end of the design project is defined at the start of the design activity. This patent assumes the following outcome (adopted from (LibAssoc 2000)): The students or practicing engineers shall have the "ability to evaluate information and incorporate it into the design". For this outcome, performance indicators are constructed. The attributes of the performance indicators are (1) Content referent (refers to content that is the focus of the instruction),
(2) Uses action verbs, and
(3) No words (e.g., completely) that express value (ABET 2012).

For the outcome, the four performance indicators have been developed to address the users' ability to:

(1) Use information from multiple sources,
(2) Construct new questions that may require additional information,
(3) Integrate new information with previous information or knowledge, and
(4) Draw conclusions based upon the information gathered. If queried, the artifact produced by this step is the list consisting of the outcome and performance indicators above.

2. Data Collection 602, 702

The data is collected from pages of the e-design notebook (see FIG. 5 and Table 2). Each page from the e-design notebook will have nine parcels of data entered by the student or practicing engineer (mentee). These parcels are (1) Project title,
(2) Design activity,
(3) Date,
(4) Participation,
(5) Narration and reflection,
(6) Sketches,
(7) Calculations, and
(8) Information source,
(9) Action items.

A query of this step yields all the data in each of the nine data parcels.

3. Data Mining 603, 703

The general data collected from the whole e-design notebook is distilled into the relevant data set. For example, for the e-design notebook depicted in FIG. 5, Data Parcel #8 (information source) is initially selected. A query of this step yields information distilled from Data Parcel #8.

4. Assessment 604, 705

Here the data from Parcel 8 is identified and prepared, and a rubric constructed. Generally, the rubrics articulate the expectations for students' performance, the characteristics for each level of performance, as well as the guidelines to the students on how to improve their performance (ASEE 2011). The rubric consists of three elements, namely, descriptors (describing a given level of performance), scale (levels of performance), and dimensions (performance indicators) (ABET 2012). Based on these three elements, the rubric in Table 3 was constructed. Note that the rubric is independent of stage of the design process and design problem. A query of this step yields the numerical values for each performance indicator.

TABLE 3

Rubric.

| PERFORMANCE INDICATOR | Beginning (1) | Developing (2) | Developed (3) | Accomplished (4) | Exemplary (5) |
|---|---|---|---|---|---|
| (1) USE information from multiple sources | Users 0 source | Uses 1 source | Uses 2 sources | Uses at least 3 sources | Uses more than 3 sources |
| (2) CONSTRUCT new questions that require additional information | Construct no questions | Construct questions not from source | Constructs a question | Constructs multiple questions | Constructs excellent multiple questions |
| (3) INTEGRATE new info with previous info or knowledge | Integrates no information | Partial info integration | Integration of info | Good integration of info | Excellent info integration |
| (4) DRAW conclusions based upon information gathered | Draws no conclusion | Draws conclusion not from source | Draws conclusion | Draws multiple conclusions | Draws excellent multiple conclusions |

The Ecosystem for Learning and Team Design assumes the default rubric and database are preinstalled, but configurable by the mentor, supervisor or instructor.

5. Evaluation 605, 706

The assessed data is interpreted using a target value for each performance indicator (ASEE 2008). The software determines whether each performance indicator has been achieved or not. A query of this step yields a summary of the performance indicators that have been achieved as well as of the ones that have not been achieved.

6. Decision and Communications with the Cloud Server or VPS 606-607, 707-708

Depending on the grade assigned during the evaluation, a determination is made on whether each of the three outcomes has been attained or not. A decision is made, and an action is undertaken by the mentee, if an outcome is deficient. The mentee is supposed to reflect that change in the next page of the e-design notebook. Likewise, the mentor should also properly amend his instructions, if an outcome was deficient. A query of this step yields the decision(s) that should be made by the mentor or mentee.

With regards to communications with the cloud server or VPS, the same principles apply here as for the Ecosystem for Team Design and Collaboration.

7. Example

Table 4 shows an example of the e-design process for information gathering. For the first step (Outcome), a query yields the artifact consisting of four performance indicators. For the second step (Data collection), a query yields the artifact consisting of all information from the e-design notebook. For the third step (Data mining), a query yields an artifact consisting of "Book," "Website," and "Standard" (see FIG. 5). In the fourth step (Assessment), the rubric in Table 3 is used to score the information. The scores of 5, 3, 4, & 4 are assigned to performance indicators #1, 2, 3, & 4, respectively. In the fifth step, based on the target value of 4, it is established that the performance indicator #2 has not been achieved. In the sixth step, a recommendation is relayed to the student or practicing engineer to improve the performance indicator #2 while creating the next page of the e-design notebook. The instructor, mentor and/or supervisor is also advised to review the essence of the performance indicator #2 during the next meeting. Once a new page is created, the steps are repeated.

TABLE 4

Example of an e-design process for information gathering.

| Step | Sample Artifact | Improve |
|---|---|---|
| Outcome | Ability to evaluate information and incorporate it into design<br>PERFORMANCE INDICATORS:<br>(1) USE information from multiple sources<br>(2) CONSTRUCT new questions that may require additional information<br>(3) INTEGRATE new information with previous information or knowledge<br>(4) DRAW conclusions based upon information gathered | Continuous improvement |
| Data collection | All information in page of e-design notebook (Data Parcel #1 to #9). See Table 2 and FIG. 4. | |
| Data mining | Extracting info only on "Source of Information" (Data Parcel #8): "Book", "Website", "Standard" (See FIG. 4 (403)) | |
| Assessment | Score for each Performance Indicator, using rubric (see Table 2):<br>(1) USE = 5, (2) CONSTRUCT = 3, (3) INTEGRATE = 4, (4) DRAW = 4 | |
| Evaluation | Use Target = 4 to determine whether Performance Indicator is achieved:<br>(1) USE = Achieved, (2) CONSTRUCT = Not achieved<br>(3) INTEGRATE = Achieved, (4) DRAW = Achieved | |
| Decision | Decide on action for each Performance Indicator:<br>(1) USE = No action, (2) CONSTRUCT = Take action to improve<br>(3) INTEGRATE = No action, (4) DRAW = No action. Mentee: better capture Performance Indicator #2 in construction of next e-design notebook page.<br>Mentor: review the essence of Performance Indicator #2 at next meeting. | | e-Design Process Applied to Generic Design Processes

7. Outcomes

The outcomes that the mentee will be able to demonstrate at the end of the design project are defined at the beginning of the activity. Here, three outcomes are adopted (Davis 2000) (Dym 2005):

(1) Functions as part of a team,
(2) Communicates in the language of design, and
(3) Defines, performs, and manages the steps of the design process.

The language of design includes textual statements, graphical representations, and math models, among others (Dym 2005). For each of these outcomes, at least two performance indicators are constructed.

8. Data Collection and Mining

Here the data is extracted from all the parcels from a page of the e-design notebook (see FIG. 5 and Table 2). In this step, the data collected from the entire e-design notebook is distilled into the information data set required for the design process. For example, for the e-design notebook summarized in Table 2, Parcels 4 and 9 are selected for Outcome #1; Parcels 5, 6, and 7 are selected for Outcome #2; and Parcels 2, 5, 6, 7, 8, and 9 are selected for Outcome #3.

9. Assessment and Evaluation

During the assessment stage, the data from the parcels corresponding to each of the three outcomes is identified and assessed. During the evaluation stage, the data, assessed for each of the performance indicators corresponding to the three outcomes, is interpreted and assigned to each of the performance indicators corresponding to the outcomes.

10. Decision and Communication

Depending on the numerical values assigned during the evaluation (based on the target values), determination is made on whether each performance indicator has been achieved or not. A decision is made, and an action undertaken, by the student (or practicing engineer), if an outcome is deficient. They are supposed to reflect that action in the quality of activities undertaken, described or captured in the next page of the e-design notebook. Likewise, the instructor or mentor, or even a supervisor, is advised to offer clarifications during the next meeting, if deficient outcomes are prevalent.

11. Confidence Metrics Enabling the System to Spot the Need for Human Review

We have built into the system a confidence metric whose purpose is to characterize the faith with which the system assigns the itemized grades (see the interface between 705 and 706). When the confidence is deemed inadequate, the system flags the design for human review. Assuming the instructor or mentor only need to manually review 5-10% of the users' designs (the corner cases), the system will reduce the mentor's load by 10-20× (usually considered quite significant).

12. Means for Encoding the Product Specifications and Design Requirements

For generic design processes, the product specifications and design requirements are encoded into the rubric and target values (see 704 in FIG. 7).

13. Ability to Handle All 5 Stages in the Design Process

The Ecosystem for Learning and Team Design can assess and evaluate outcomes from the design activities, associated with any of the five stages of the design process. Conceptually, design data from each of the stages can be collected using standardized e-design notebooks and assessed in a fashion analogous to Table 4. FIG. 8 explains how design notebooks can be used to tell a story that extends through the design project, systematically capturing the product specifications, design requirements and increasing levels of engineering detail.

Facilities Intended Specifically for Mentors, Supervisors or Team Mates 312, 313

1. Supervisor Layer Providing Access Privileges Not Visible to Regular Practitioners The Ecosystem supports a special mode for instructors, mentors and supervisors. Here the underlying architecture remains the same, but broader access privileges are provided. The real-time alerts from the different designers are logged by the database and made available through a portal, in a prioritized (sorted) fashion. The instructors, mentors and supervisors can sort through the logs. They can access the logs at their discretion, and choose what and how to respond. The system can help supervisors develop sense for budget expenditures and forecast completion dates.

The supervisor layer also collects statistics on deficient outcomes across the user population and provides graphical presentation. This allows instructors, mentors and supervisors to easily tell if deficient outcomes are prevalent across the user population.

Similarly, the supervisor layer collects notes from students regarding additional explanations requested, for example regarding alerts that the student cannot make fully sense of, and address, on their own.

2. Preventing Excessive Pinging of Mentors or Supervisors

The supervisor layer is configurable, and hence provides significant flexibility. If mentors or supervisors think they are being excessively pinged, they can adjust the configuration settings. They can choose only to receive copies of alerts of higher priority (severity).

Facilities for Support Personnel: Interfaces with DPM, PLM, CAD or CPD Tools, 310

To offer meaningful benefits to large design organizations, it is of paramount importance to offer an interface with the popular tools for DPM, PLM, FEA, CAD, or the existing tools for CPD (based for example Wiki or Sharepoint). This enables the design organizations to integrate the Ecosystem, or perhaps only the e-design process, with the existing infrastructure.

1. Greater Goods: Benefits to Engineers Involved in Design Modification, Extension, Validation or Customization The overarching goal of the design organizations is to make the overall workforce more productive, not only the design engineers. The interfaces allow engineering support personnel, such as verification engineers, test engineers, process engineers or quality control engineers, access designs developed using the Ecosystem, and modify, extend, further validate or customize. The Ecosystem benefits engineers involved in different parts of the development tool chain, starting out with the conceptual design, but extending to detailed design and all the way to packaging.

2. The Solution: Customized APIs

The interfaces are developed utilizing the SDKs provided by the vendors of the CAD or validation (FEA) tools. Each interface is likely to be unique. The level of customization needed is expected to vary. As noted above, the Ecosystem benefits the engineers that, for example, use SolidWorks for the detailed design, but it also can help the ones validating the design (say, utilizing FAE tools for validation of stress analysis). The Ecosystem has access to the pertinent design files and documents, so it can validate the design against the design process.

Software for the Mobile Clients 308 309

1. How to Make the Software

FIG. 7 presents the high-level architecture for the software running on the individual tablets. The integrated system can rely on the OpenCV computer vision library (OpenCV 2014). And in case of native applications running on the Android platform, the system can be implemented using the Java Development Kit (Oracle 2014), the Android Developer Tools integrated into the Eclipse development environment (AndroidSDK 2014), as well as the Android Native Development Kit. The html5 and hybrid applications can be developed in JavaScript in development environment provided by Visualforce (VisualForce 2014), or using Xamarin (Xamarin 2014).

3. Interface Specification and High-Level Data Structures

Figure 10:
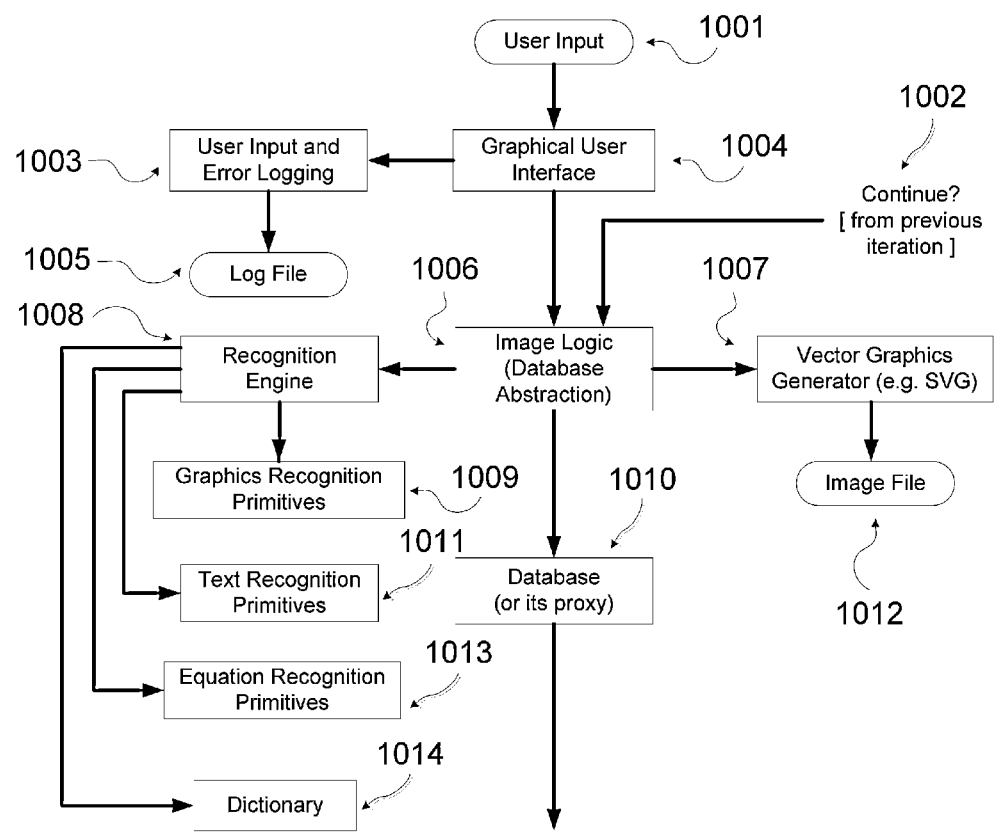
FIG. 10 presents a dependency diagram for the data collection stage of the e-design process.
Figure 11:
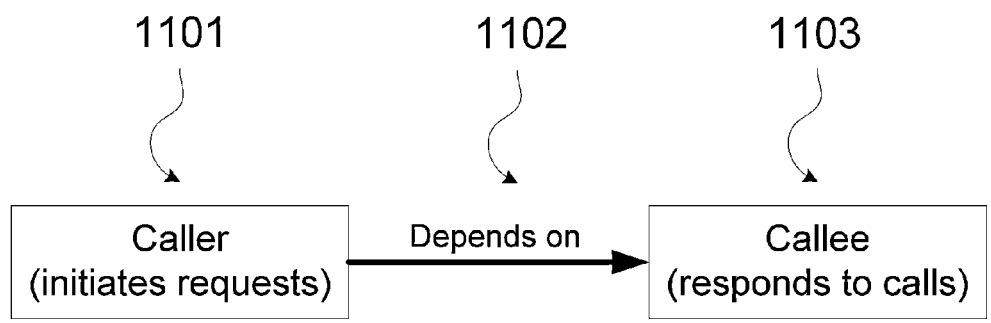
FIG. 11 is a supporting diagram to FIG. 10 explaining the nature of the dependency relation between the caller and the callee.

FIG. 10 presents the dependency diagram for the data collection module. This one has been artfully crafted not to contain any loops (Steingrimsson 2014). This helps tremendously when it comes to tracking down the cause of certain behavior (desired or undesired). FIG. 11 explains the exact meaning of the arrows in FIG. 10, i.e., the relationship between the caller and the callee.

Figure 12:
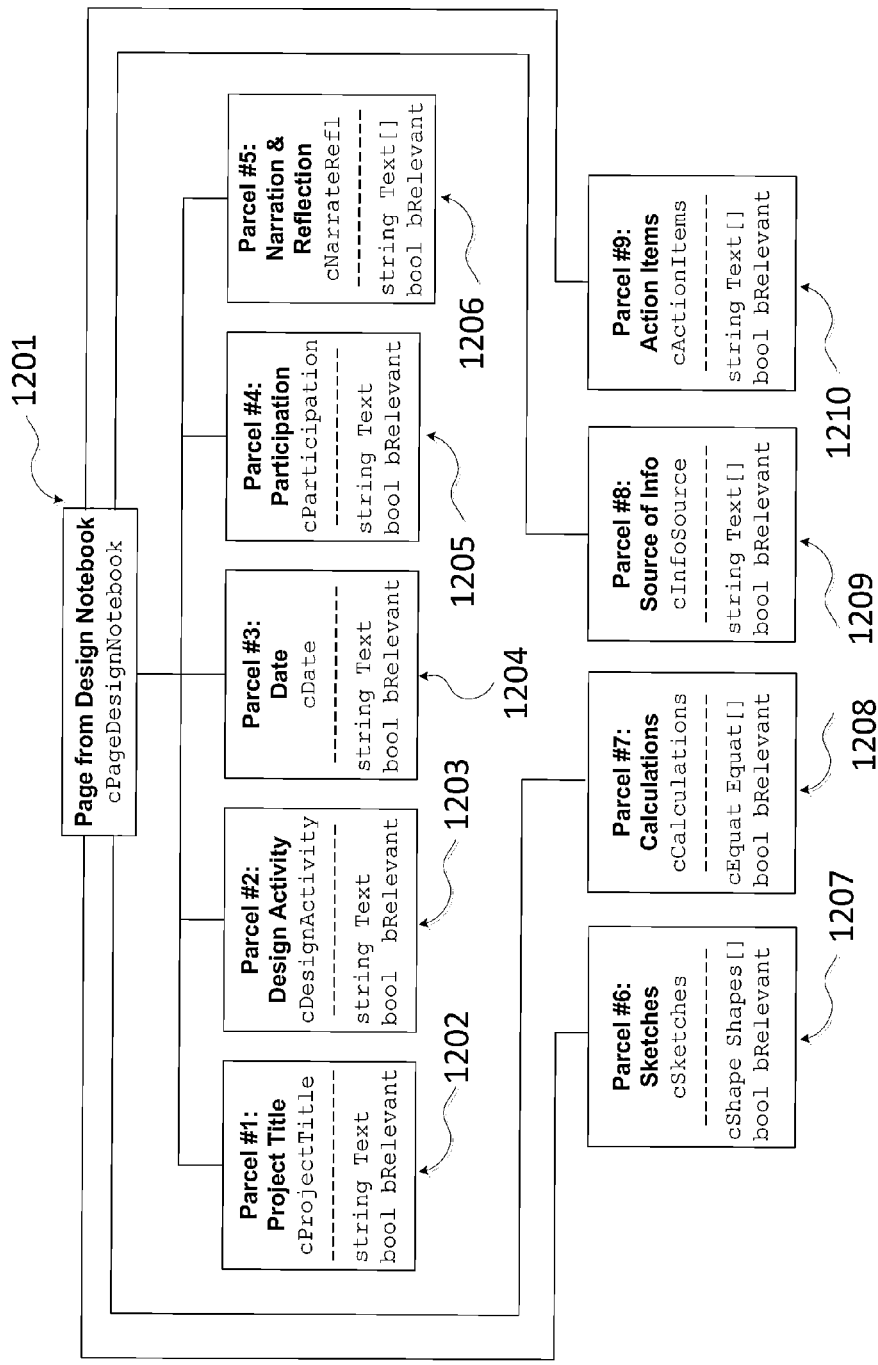
FIG. 12 depicts the software structure encapsulating the pages from the e-design notebooks.

FIG. 12 formulates the software structure capturing the pages of the design notebooks (the output from the data collection module). The nine Parcels contain, but do not inherit from the 'Text', 'Graphics' or 'Equation' classes. The composition of the latter classes is explained in (Steingrimsson 2014). Note that some of the Parcels, like Parcel #3 ('Date'), only contain a 'Text' object (no 'Graphics' or 'Equation'). Of further interest is the flag bRelevant which specifies whether or not the Parcel is deemed relevant in the context provided. This assignment takes place in the mining module.

Table 5 outlines the interface between the mining, assessment, evaluation and decision modules. N represents the number of performance indicators used (N=4 in Table 3). K denotes the size of the data base with the relevant sources, and M characterizes the number of allowed values for each performance indicator (M=5 in Table 3).

TABLE 5

Standardized structure of the inputs and outputs to the mining, assessment, evaluation and decision modules.

| Quantity | Data Structure |
| --- | --- |
| Primary inputs to the data collection module | |
| user input (graphics) | cShapes Shapes[ ] |
| user input (typed text) | string Text [ ] |
| user input (equations) | cEquat Equat [ ] |
| outcomes | N/A (reflected in the performance indicators) |
| continuation indicator | bool cContinue |
| Inputs to the assessment module | |
| content provided | Parcels from cPageDesignNotebook with bRelevant set to true or false |
| rubric | string Rubric [N][M] |
| Inputs to the decision module | |
| list of items achieved | bool itemsAchieved [N] |
| confidence achieved | float confAchieved[N] |
| hard-coded messages | string messages [ ] |
| Inputs to the mining module | |
| page from an e-design notebook | Object of type cPageDesignNotebookwith bRelevant unassigned (see FIG. 12) |

TABLE 5-continued

Standardized structure of the inputs and outputs to the mining, assessment, evaluation and decision modules.

| Quantity | Data Structure |
| --- | --- |
| relevant sources | string sourceName [K] |
| min. relevance threshold | int relevanceThresh |
| Inputs to the evaluation module | |
| itemized grades | int itemizedGrades [N] |
| confidence metrics | float confMetrics [N] |
| targets | int Targets [N] |
| Inputs to the communication module | |
| itemized decisions | string itemizDecisions [N] |

3. Role of the Database: Substitute for AI Mechanism 704

One of the primary functions of the database in FIG. 7 is to serve as a substitute for an artificial intelligence mechanism. Instead of creating a true AI system, capable of assessing the relevance of the content provided with the topic at hand, we create a database that stores, among others, the key design objectives, pitfalls, design indicators, design questions, reference designs, books, standards and websites (essentially the meaningful responses). This arms the system with a level of robustness and allows it to guard against incomplete or invalid responses. Only marginal updated to the database are expected to be needed between years or between projects.

The relevancy validation is accomplished through a staged process comprising of the following steps:

a. Cross-Reference with a Database Containing Known, Good Sources.

If a content item provided matches exactly with an item from the database, bRelevant=1.

An item providing partial match receives conditional validation.

b. Syntax Verification.

Especially for web links, it is possible to prune out items with obvious syntax violations.

c. Real-Time Checks Augmenting Extrapolation from the Database Items.

Example: In case of a project on mechanical design, the user may provide the following web link, for Parcel #8 (Information Source):

www.asme.org/some-garbage.pdf

Presumably, provides partial match with an item from the database. But when the system tries to open up some-garbage.pdf in real-time, it discovers this link does not exist. Hence bRelevant=0, for this parcel.

d. Checking for Existence of Content Key Words (from the Database) in the References Provided.

In case of a mechanical project for building a water tank, you expect the references provided to contain key words such as 'tank', 'tower', 'base', 'support', 'water', 'stress compression', etc. If the user, for example, provided a reference a .pdf document from the ieee.org database on transition design, the check for the content key words would fail, even though the real-time check resulted in a pass (meaning that the .pdf file actually existed and was accessible).

Another paramount uniqueness pertains to the fact that the database does not only store the graphical, text and equation objects recognized, but also their inter-relations (Steingrimsson 2014).

4. More on the Implementation of the Data Collection Module 602, 702 a. The Graphical User Interface

Figure 4:
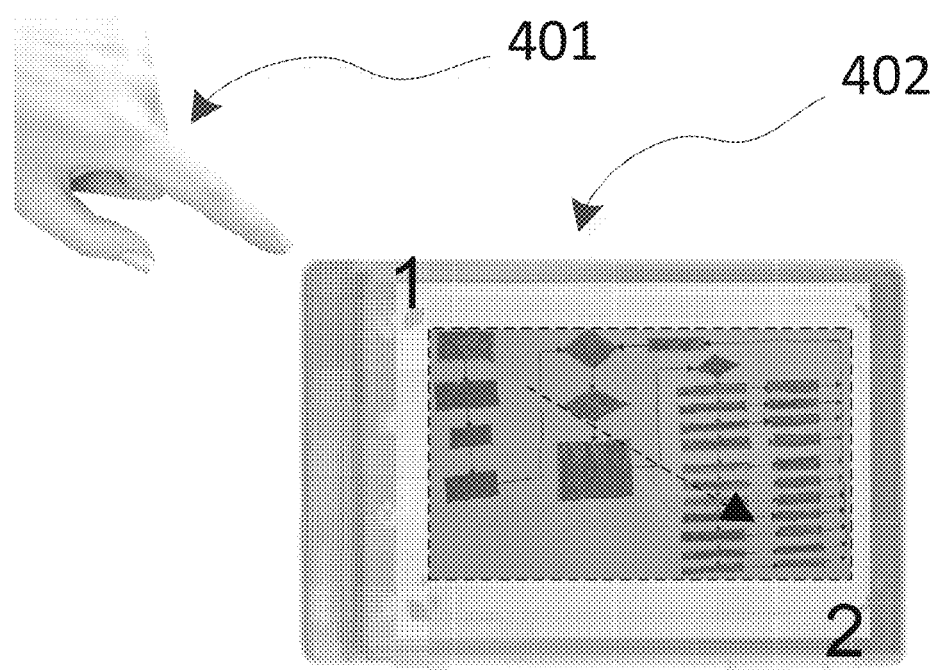
FIG. 4 explains how the concept of a mask can be utilized to suppress artifacts related to shadows, reflections or the background color of the wall, hence facilitating accurate recognition of the graphical objects.

The graphical user interface, shown in FIG. 4, implements parcels from the e-design notebooks, harnessing the same key words as in Table 1. This is a multi-tab GUI where the window for each key word occupies more or less the entire canvas area, when the user inputs content specific to that parcel. Then, the windows for the other templates slide into the background. Through an ingenious design of the multi-tab GUI, one expects canvas as small as 7 inches in diagonal length to suffice for creating meaningful designs. This mitigates one of the primary risk factors for usability (limited canvas area).

b. Recognition of the Graphical Objects

The object recognition operates on bitmap images generated from mobile computing (tablet) devices. It is as a sub-function within the data collection stage (602 and 702). The user specifies whether the next object is a graphical, text or equation object (see Step 3 in FIG. 7). The primary uniqueness of the object recognition running on the mobile devices pertains to the incremental recognition. Compared to the SketchRec™ paradigm (Steingrimsson 2014), the graphics recognition on the mobile devices is conceptually simpler in the sense that the algorithms only need to recognize a single object at a time. There is no need to dissect a complex image all at once.

As for the Ecosystem for Team Design and Collaboration, the preferred embodiment assumes the recognition assignments are run locally, as much as the resources on the mobile clients allow, for reasons related to the cost of renting compute resources on the VPS or cloud server. The invention also allows for heavy-duty processing assignments to be offloaded to the cloud server, through dynamic load balancing.

c. Recognition of the Connectors

Conceptually, the recognition of the connectors consists of a simplified version of the algorithms outlined in (Steingrimsson 2014). Integration issues aside, the connectors can be recognized as long and thin structures, usually with an arrow on either or both ends, that are associated with graphical or text objects that already have been recognized. Again, we are not detangling the image all at once, as is the case for the desktop/laptop version of SketchRec™ (Steingrimsson 2014), but executing the recognition incrementally.

d. Support for Typing in Text and for Recognizing Handwritten Information

The Ecosystem for Learning and Team Design provides the user with facilities for typing in text (no handwritten information). It also allows the user to invoke built-in capabilities for handwriting recognition. In the case of no handwritten information, the software provides a keyboard for the user to enter the text associated with each data parcel (see FIG. 5).

E. Handwriting Recognition: Masking Latency for Real-Time Experience

The handwriting recognition for the Ecosystem for Learning and Team Design differs in one very important aspect from the one deployed for the Ecosystem for Team Design and Communications: The Ecosystem for Learning and Team Design supports live input from a stylus.

For the Ecosystem for Learning and Team Design, the handwriting recognition is offloaded from the mobile devices and run in a cloud system, on a VPS, VM or in a data center. The primary benefit here pertains to the ability to deploy a single recognition solution across multiple mobile platforms (Windows, Android, iOS, FFOS, etc.). The recognition algorithms running on the server utilize the Ink Collection, Ink Data Management and Ink Recognition APIs (InkAPIs 2014).

Figure 9:
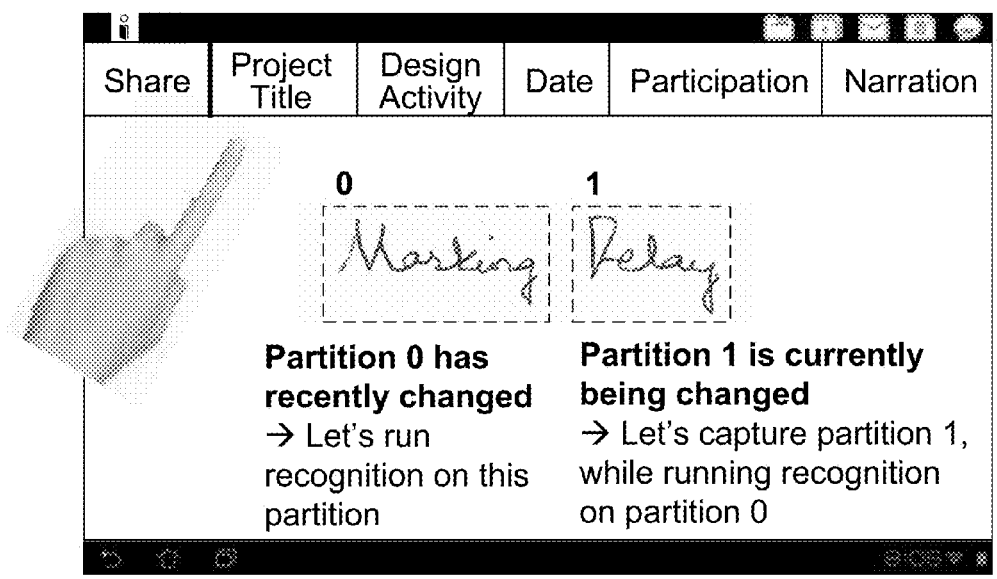
FIG. 9 illustrates how processing latency can be masked on the mobile clients, offering the user with the perception of near real-time recognition.

It is of paramount importance to minimize, and compensate for (mask), the latency introduced when transmitting the stylus input to the server, waiting for the server to run the recognition and to return the results. The overall goal is to configure the recognition such that it does not impact the user experience (productivity). To this effect, the handwriting recognition algorithms for the Ecosystem for Learning and Team Design rely on the following:

1. Recognition of the areas that have just been changed vs. the ones that are currently being changed.
2. Dictionary look-up to establish what constitutes a complete vs. a partial word. The system is not designed to launch the recognition when the stylus is lifted up in the middle of a word.
3. Partitioning the canvas accordingly: The algorithms identify minimal assembly of stylus strokes comprising a complete word. These are processed in parallel with the data capture (see FIG. 9).
4. Running the recognition on the isolated chunk that was just recently changed (the min. assembly of stylus strokes constituting a complete word), while capturing what is currently being changed.
5. Efficient data structures for sending the condensed data.

To paraphrase, the processing delay depends heavily on what data is transmitted exactly. As long as the data is available by the time the user needs it, the user experience is not impacted, and the user likely does not mind about the delay, even though it is a second or two. The Ecosystem for Learning and Team Design masks the delay by properly identifying the minimal assembly of stylus strokes and only transmitting those onto the wire as an isolated chunk.

Certain functions, related to the recognition, still reside on the mobile clients, such as rendering of the recognized text.

For optimization on the server side for masking the latency, the Ecosystem for Learning and Team Design is, further, designed to support routing based on IP address of the client to the server with the closest physical proximity.

f. Equation Recognition

The Ecosystem for Learning and Team Design is designed to support essentially the same algorithms for equation recognition as the Ecosystem for Team Design and Collaboration. Yet, only here the calculations from the standardized e-design notebooks are serving as inputs to the validation of critical design parameters or design stages.

g. Elegant Vector Representations

Similar to the Ecosystem for Team Design and Collaboration, the Ecosystem for Learning and Team Design is designed to offer elegant representations of the vector objects recognized.

The Cloud Server or VPS 301, 302

FIG. 3 captures the key components of the overall, cloud-based architecture. While the cloud server is primarily intended for archiving the team design work, carrying out handwriting recognition and facilitating communications, it can also store the dictionaries, the object databases and assume responsibility for other heavier-duty processing assignments. It is incumbent upon the mentor or the mentee to make a decision on the data (the outcomes of the evaluations) communicated back to the mobile devices from the cloud server.

Each team member (mentee) runs a local MySQL in-memory database on the tablet, which in turn possess a larger global database on the cloud server. The mentees can first save their design work and settings locally and then upload to the cloud server periodically.

Another key premise involves the team members' ability to run the recognition locally, when WiFi access to the cloud server is not available. When such access is available, the recognition engine can connect the server for the purpose of matching object candidates across a larger set of features (based on larger dictionaries).

Moreover, if a mobile device is lost, the global hosting on the cloud server allows downloading the design files and settings to a new device. The design work would not be lost. Conversely, if the cloud server is down, a new server can be assembled using the content from the local repositories. This redundancy mechanism resembles the construction of GIT servers (GIT 2014).

3.3 Ecosystem with Specialized Capabilities for Handwriting Recognition

Here we the handwriting recognition is extracted out of the Ecosystem for Team Design and Collaboration as well as from the Ecosystem for Learning and Team Design and combined in a new Ecosystem. The recognition of handwritten text, both cursive handwriting and isolated letters, is offered as a service which can be utilized stand-alone, combined with other tasks or even other Ecosystems. The primary benefit involves the deployment of a single recognition engine across multiple network connected platforms—including multiple mobile clients (running iOS, Windows, Android, FFOS or another mobile operating system).

Figure 13:
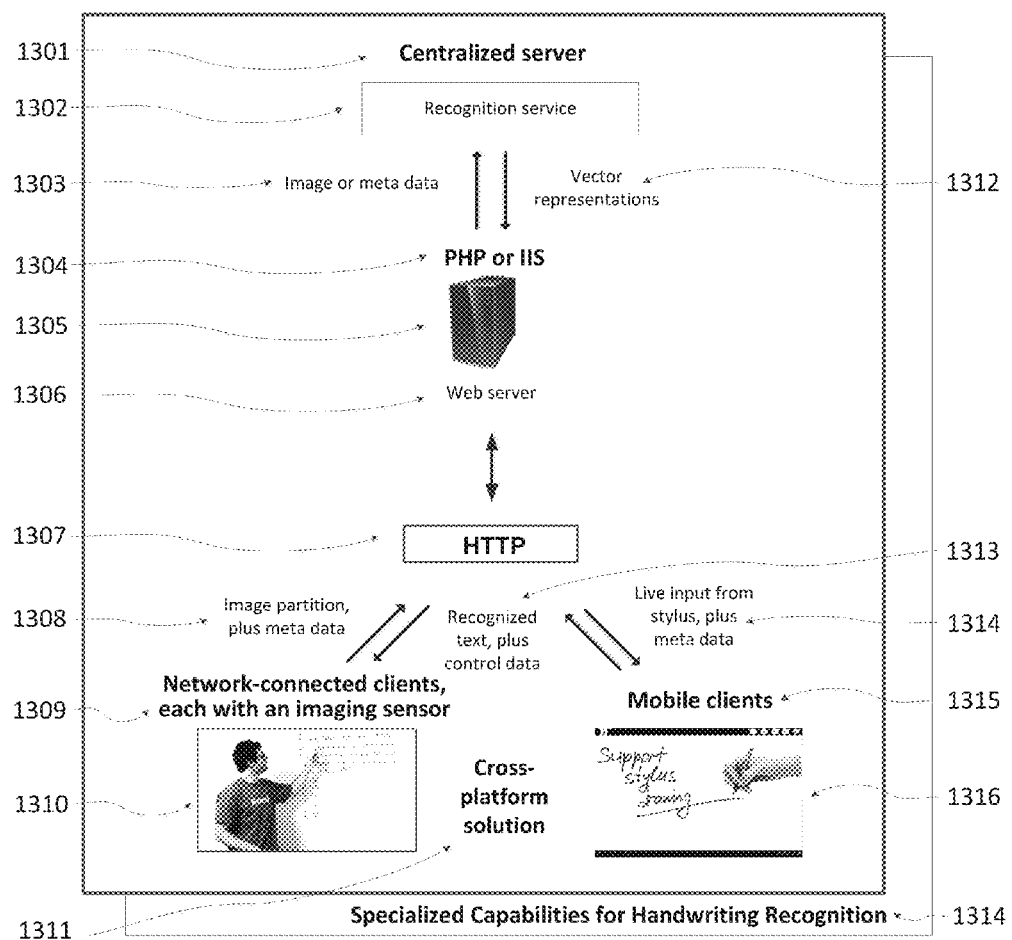
FIG. 13 presents high-level architecture for an Ecosystem with specialized capabilities for handwriting recognition. This Ecosystem offers handwriting recognition as service. It is capable of recognizing both cursive handwriting and isolated latter as well as of servicing a variety of mobile clients (those running Windows, Android, iOS, FFOS or another mobile operating system).

The high-level architecture for the Ecosystem with the specialized capabilities for the handwriting recognition, presented in FIG. 13, exhibits great degree of resemblance with the corresponding architectures for the Ecosystem for Team Design and Collaboration as well as the Ecosystem for Learning and Team Design. The network infrastructure and server configuration remains the same. All the handwriting recognition algorithms run on the server side. The operating system installed on the server (cloud, VPS, VM or a data center) is presumed to be a version Windows Server OS with commercial access licenses and recent enough to support the Ink Collection, Data Management and Recognition APIs.

The strategies for configuring and optimizing the handwriting recognition algorithms (minimizing and masking the processing latency for the purpose of providing real-time experience to the user) also remain the same.

4. How to Use the Invention

There exist many venues and opportunities for utilizing the Ecosystems:

1. Efficient Dissemination of Content from Whiteboard Meetings, Such as for Planning, Brainstorming or Design to On-Site Team Members, Off-Site Team Members or Other Stakeholders Here the image sensors on a laptop or mobile device would be used to generate a raster-scan image of the whiteboard after the meeting (see FIG. 2). The vector graphics provided by the Ecosystem for Team Design and Collaboration improves productivity by allowing attendees to create presentable entities, such as formal project reports or presentations, without having to redraw or retype notes or design sketches from the meeting. Image sketches serve as means of communications for many different types of professionals: Inventors, architects, engineers (multiple disciplines), managers, executives, etc.

2. Efficient Dissemination of Material from Customer Visits (Off-Site) or Produced During Field Work The Ecosystem for Team Design and Collaboration can for example be used by professionals that meet clients on site and collect information on the customer requirements in the form of schematic diagrams (exchange sketches of different ideas with the customer), and then relays the preferred sketches to designers back in the office for design and analysis.

3. Teaching Engineering Students Proper Design Techniques

The Ecosystem for Learning and Team Design is targeted, in part, towards educational institutions that teach courses on engineering design. Here the primary customers are students (mentees) of design courses, especially capstone design courses, and their instructors (mentors). The Ecosystem for Learning and Team Design will allow the instructors (or mentors) to assess students' performance with less subjectivity, and on a continual basis. It will contribute to the training of strong and competitive STEM workforce. The Ecosystem will enable individualized learning for the digitally sophisticated millennials by allowing customized configurations of the tablet device to suit different learning styles. Higher quality teaching is expected to result from more rapid response from the instructors (mentors) and enhanced ability to get the students (mentees) back on track. The technology also provides students with means to stimulate their creativity during the design process, by enabling quick explorations of variations of key design ideas (note vector objects can be moved around, no need to redraw).

4. Training Entry-Level Engineers on the Internal Design Processes of Given Organizations Similarly, the Ecosystem for Learning and Team Design is also suited for engineering design companies that train their entry level engineers (mentees) by pairing them up with senior, experienced engineers (mentors). The Ecosystem can be used to teach entry-level designers effective design techniques, leading to productivity enhancements that would result in increased competiveness, higher quality, and shorter time-to-market.

5. Helping Experienced Engineers Avoid Design Oversights

The Ecosystem for Learning and Team Design can help all practicing engineers stay on track throughout the design project, ensure efficient compliance with the design processes and minimize the chance of unproductive activities or oversights.

6. Helping Supervisors Track Design Progress

The supervisor layer allows managers to viewing logs related to design activities and progress (archived alerts). The Ecosystem for Learning and Team Design can help supervisors in terms of producing seamless and expeditious reports and responses related to design activities. It can also help in terms of tracking resource expenditures and projecting completion dates.

7. Efficient Dissemination of Design Information to Engineers not Directly Involved in the Product Design Itself (Engineers Working on Related Support Activities)

Through the interface with the data product management tools, the collaborative product development tools, the product lifecycle management tools, engineers not directly involved in the original product design tools can implement, tweak and verify designs developed using the Ecosystem for Learning and Team Design. Design files may be archived in a database from which the latter engineers can check them out. Similarly, engineers working further downstream in the product development chain can access the cloud server for design related data.

8. Add-on or Plugin to the Electronic Lab Notebooks

The e-design process by itself can be utilized as an add-on to electronic lab notebooks running on mobile devices.

9. Interface (Add-on or Plugin) to CAD Packages

The e-design process, or other parts of the Ecosystem for Learning and Team Design, can be integrated into CAD tools, such as AutoCAD, CATIA, PTC Creo or SolidWorks, for example as a plug-in, and hence can benefit engineers involved in detailed design.

10. Interface (Add-on or Plugin) to the PLM, DPM or CPD Systems

Similarly, the e-design process, or other parts of the Ecosystem for Learning and Team Design, can be integrated into the Product Lifecycle Management, Data Product Management or other tools for Collaborative Product Development (existing ecosystems).

11. Interface (Add-on or Plugin) to Tools for Design Validation

The Ecosystem for Learning and Team Design supports interfaces with tools for design validation, e.g., with the FEA tools used to validate the stress analysis.

12. Recognition of Handwritten Text, Comprising Either of Cursive Handwriting or Isolated Letters, Offered as a Service to a Variety of Network Connected Clients (Including Mobile)

The Ecosystem with the specialized capabilities for the handwriting recognition can be used to offer handwriting recognition as a service to a variety of network connected clients, including mobile clients running iOS, Windows, Android, FFOS or another mobile operating system.

5. Further Examples of the Invention

Thus, it will be appreciated by those skilled in the art that the present invention is not restricted to the particular preferred embodiments described with reference to the drawings, and that variations may be made therein without departing from the scope of the invention.

What is claimed is:

1. A method referred to as e-design process, for automatically assessing quality of design work relative to each stage in a given design process, for the purpose of efficient learning and productive team design, a continuous improvement method operating on pages from standardized e-design notebooks, a method further utilizing:
   a recognition step for carrying out incremental recognition of graphics, text or equation objects, and for producing vector graphics,
   an image logic step, which is capable of producing an intermediate output containing the vector graphics,
   a data mining step, for extracting information relevant to the design process from the vector objects recognized,
   an assessment step, for assessing the information extracted and producing itemized grades with associated confidence levels,
   an evaluation step, for interpreting the itemized grades using a programmable assessment rubric,
   a decision making step, for producing itemized decisions based on the itemized grades,
   a configurable supervisor review step, for allowing supervisors track design progress, by reviewing logs of status or design alerts, derive budget or cost estimates, or project a completion date,
   a communication step, for communicating information about necessary actions among designers, to a mentor, supervisor or sponsor, and
   a database access step, for storing or retrieving information related to target outcomes, design objectives, the assessment rubric, design indicators, minimum relevance thresholds, design questions, summary of known pitfalls, reference designs, books, standards and websites, and other meaningful responses, as well as dictionaries with the valid objects supported by the graphics, text or equation recognition.

2. A method according to claim 1, capable of automatically assessing quality of design activities for each stage of a given design process, wherein the quality of design activities relative to a given stage in the process is automatically assessed and communicated among designers, to a mentor, supervisor or sponsor, through a continuous improvement process comprising of the following steps:
   a. Definition of outcomes,
   b. Data collection,
   c. Data mining,
   d. Assessment,
   e. Evaluation,
   f. Decision, and
   g. Communication.

3. A method according to claim 1, wherein the standardized e-design notebooks, serve as electronic project journals, and are used in conjunction with the e-design process, and contain the following parcels:
   a. Project title,
   b. Design activity,
   c. Date,
   d. Participation,
   e. Narration and reflection,
   f. Sketches,
   g. Calculations,
   h. Source of information, and
   i. Action items.

4. A method according to claim 1, wherein the database storing the design objectives, a summary of known pitfalls, design indicators, design questions, reference designs, books, standards and websites, and other meaningful responses, is employed as a substitute for an artificial intelligence mechanism, for the purpose of establishing relevance of content provided with the subject matter at hand.

5. A method according to claim 1, wherein
   the data collection, mining, assessment, evaluation and decision stages are executed locally on mobile clients, as a native, hybrid or HTML5 application, to the extent that the computing resources on the mobile clients allow,
   computational assignments related to these stages are offloaded to a centralized server, such as a cloud server, virtual private server, virtual machine or data center, through dynamic load balancing, only when the resources on the mobile clients are unable to assume additional load, but in a manner that masks the processing delay to the user, and
   the computational assignments are executed locally on the mobile clients, during periods where communications with the centralized server is not available.

6. A method according to claim 1, wherein the product specifications, design requirements and project goals are captured in the form of outcomes, rubrics and targets, in order to facilitate computerized assessment of designs by scoring content from the designs against the rubrics.

7. A method according to claim 1, wherein the method for automatically assessing quality of design work relative to each stage in a given design process utilizes programmable rubrics, confidence metrics and itemized grades, for the purpose of enabling a computer to assess designs by scoring content from the designs against the rubrics.

8. A method according to claim 1, wherein the module for automatically assessing the quality of the design activities relative to a given stage in a design process, referred to as the e-design process, provides information to electronic lab notebooks through an application program interface, upon request, for the purpose of promptly communicating design deficiencies identified, and hence for improving productivity of users of the electronic lab notebooks and the quality of their designs.

9. A method according to claim 1, wherein the engine for automatically assessing the quality of design activities relative to a given stage in a design process provides information to computer aided design, verification or validation, product lifecycle management, data product management or collaborative product development tools through an application program interface, upon request, for the purpose of promptly communicating design deficiencies identified, and hence for improving productivity of users of these tools and the quality of their designs.

\* \* \* \* \*